(12) United States Patent
Bull et al.

(10) Patent No.: US 8,404,203 B2
(45) Date of Patent: Mar. 26, 2013

(54) PROCESSES FOR REDUCING NITROGEN OXIDES USING COPPER CHA ZEOLITE CATALYSTS

(75) Inventors: Ivor Bull, Ludwigshafen (DE); Wen-Mei Xue, Dayton, NJ (US); Patrick Burk, Freehold, NJ (US); R. Samuel Boorse, Skillman, NJ (US); William M. Jaglowski, West Orange, NJ (US); Gerald S. Koermer, Basking Ridge, NJ (US); Ahmad Moini, Princeton, NJ (US); Joseph A. Patchett, Basking Ridge, NJ (US); Joseph C. Dettling, Howell, NJ (US); Matthew T. Caudle, Hamilton, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/480,360

(22) Filed: Jun. 8, 2009

(65) Prior Publication Data

US 2009/0285737 A1    Nov. 19, 2009

Related U.S. Application Data

(62) Division of application No. 12/038,423, filed on Feb. 27, 2008, now Pat. No. 7,601,662.

(60) Provisional application No. 60/891,835, filed on Feb. 27, 2007.

(51) Int. Cl.
*B01D 53/56* (2006.01)
*B01D 53/94* (2006.01)

(52) U.S. Cl. .............. 423/213.5; 423/177; 423/212; 423/213.2; 423/213.7; 423/235; 423/239.1; 423/239.2

(58) Field of Classification Search .............. 423/212, 423/213.2, 213.5, 235, 239.1, 239.2, 177, 423/213.7
See application file for complete search history.

(56) References Cited

U.S. PATENT DOCUMENTS

| | | |
|---|---|---|
| 3,346,328 A | 10/1967 | Sergeys et al. |
| 4,220,632 A | 9/1980 | Pence et al. |
| 4,297,328 A | 10/1981 | Ritscher et al. |
| 4,440,871 A | 4/1984 | Lok et al. |
| 4,544,538 A | 10/1985 | Zones |
| 4,567,029 A | 1/1986 | Wilson et al. |
| 4,735,927 A | 4/1988 | Gerdes et al. |
| 4,735,930 A | 4/1988 | Gerdes et al. |
| 4,861,743 A | 8/1989 | Flank et al. |
| 4,867,954 A | 9/1989 | Staniulis et al. |
| 4,874,590 A | 10/1989 | Staniulis et al. |
| 4,961,917 A | 10/1990 | Byrne |
| 5,024,981 A | 6/1991 | Speronello et al. |
| 5,041,270 A | 8/1991 | Fujitani et al. |
| 5,096,684 A | 3/1992 | Guth et al. |
| 5,233,117 A | 8/1993 | Barger |
| 5,313,792 A | 5/1994 | Katoh et al. |
| 5,417,949 A | 5/1995 | McWilliams et al. |
| 5,477,014 A | 12/1995 | Dunne et al. |
| 5,516,497 A | 5/1996 | Speronello et al. |
| 5,589,147 A | 12/1996 | Farnos et al. |
| 5,589,149 A | 12/1996 | Garland et al. |
| 5,733,837 A | 3/1998 | Nakatsuji et al. |
| 5,884,473 A | 3/1999 | Noda et al. |
| 6,139,808 A | 10/2000 | Mizuno et al. |
| 6,162,415 A | 12/2000 | Liu et al. |
| 6,171,556 B1 | 1/2001 | Burk et al. |
| 6,316,683 B1 | 11/2001 | Janssen et al. |
| 6,319,487 B1 | 11/2001 | Liu et al. |
| 6,350,298 B1 | 2/2002 | Su et al. |
| 6,376,562 B1 | 4/2002 | Ihm et al. |
| 6,395,674 B1 | 5/2002 | Fung et al. |
| 6,503,863 B2 | 1/2003 | Fung et al. |
| 6,569,394 B2 | 5/2003 | Fischer et al. |
| 6,576,203 B2 | 6/2003 | Abe et al. |
| 6,606,856 B1 | 8/2003 | Brown et al. |
| 6,685,905 B2 | 2/2004 | Mertens et al. |
| 6,696,032 B2 | 2/2004 | Mertens et al. |
| 6,709,644 B2 | 3/2004 | Zones et al. |
| 6,974,889 B1 | 12/2005 | Verduijn et al. |
| 7,014,827 B2 | 3/2006 | Mertens et al. |
| 7,049,261 B2 | 5/2006 | Nam et al. |
| 7,094,389 B2 | 8/2006 | Cao et al. |
| 7,182,927 B2 | 2/2007 | Tran et al. |
| 7,229,597 B2 | 6/2007 | Patchett et al. |
| 7,601,662 B2 | 10/2009 | Bull et al. |
| 2001/0038812 A1 | 11/2001 | Yavuz et al. |

(Continued)

FOREIGN PATENT DOCUMENTS

| DE | 394541 A1 | 6/1990 |
|---|---|---|
| DE | 10059520 | 5/2001 |

(Continued)

OTHER PUBLICATIONS

Ishihara et al., "Copper Ion-Exchanged SAPO-34 as a Thermostable Catalyst for Selective Reduction of NO with C3H6", Journal of Catalysis, 169, 93-102, 1997.*

Ishihara et al., "Thermostable Molecular Sieves, Silicoaluminophosphate (SAPO)-34, for the Removal of NOx with C3H6 in the Coexistence of O2, H2O, and SO2", Ind. Eng.Cmen. Tes., 36, 17-22, 1997.*

Ishihara et al., "Copper Ion Excahnged Silicoaluminophosphate (SAPO) as a Thermostable Catalyst for Selective Reduction of NOx with Hydrocarbons", Studies in Surface Science and Catalysts, 84, 1493-1500, 1994.*

(Continued)

*Primary Examiner* — Elizabeth Wood
(74) *Attorney, Agent, or Firm* — Melanie L. Brown; Scott S. Servilla; Servilla Whitney

(57) ABSTRACT

Zeolite catalysts and systems and methods for preparing and using zeolite catalysts having the CHA crystal structure are disclosed. The catalysts can be used to remove nitrogen oxides from a gaseous medium across a broad temperature range and exhibit hydrothermal stable at high reaction temperatures. The zeolite catalysts include a zeolite carrier having a silica to alumina ratio from about 15:1 to about 256:1 and a copper to aluminum ratio from about 0.25:1 to about 1:1.

31 Claims, 11 Drawing Sheets

U.S. PATENT DOCUMENTS

| | | |
|---|---|---|
| 2001/0043896 A1 | 11/2001 | Domesle et al. |
| 2002/0016252 A1 | 2/2002 | Takahashi et al. |
| 2002/0084223 A1 | 7/2002 | Feimer et al. |
| 2003/0069449 A1 | 4/2003 | Zones et al. |
| 2004/0082466 A1 | 4/2004 | Cao et al. |
| 2004/0098973 A1 | 5/2004 | Tennison et al. |
| 2004/0166035 A1 | 8/2004 | Noda et al. |
| 2004/0171476 A1 | 9/2004 | Nam et al. |
| 2004/0209760 A1 | 10/2004 | Yoshikawa |
| 2005/0031514 A1 | 2/2005 | Patchett et al. |
| 2005/0096214 A1 | 5/2005 | Janssen et al. |
| 2006/0039843 A1 | 2/2006 | Patchett et al. |
| 2006/0115403 A1 | 6/2006 | Yuen |
| 2007/0000243 A1 | 1/2007 | Liu et al. |
| 2007/0043249 A1 | 2/2007 | Cao et al. |
| 2007/0149385 A1 | 6/2007 | Liu et al. |
| 2007/0286798 A1 | 12/2007 | Cao et al. |
| 2008/0241060 A1 | 10/2008 | Li et al. |
| 2008/0317999 A1 | 12/2008 | Patchett et al. |
| 2009/0048095 A1 | 2/2009 | Li et al. |
| 2009/0060809 A1 | 3/2009 | Shioya et al. |
| 2009/0196812 A1 | 8/2009 | Bull et al. |
| 2010/0092362 A1 | 4/2010 | Li et al. |
| 2010/0290963 A1 | 11/2010 | Andersen et al. |
| 2011/0165052 A1 | 7/2011 | Beutel et al. |
| 2011/0182791 A1 | 7/2011 | Fedeyko et al. |
| 2011/0200505 A1 | 8/2011 | Cavataio et al. |

FOREIGN PATENT DOCUMENTS

| | | |
|---|---|---|
| EP | 0396085 | 11/1990 |
| EP | 0624393 A1 | 11/1994 |
| EP | 0773057 A1 | 5/1997 |
| EP | 0950800 A2 | 10/1999 |
| EP | 1837489 A1 | 9/2007 |
| JP | 05-057194 | 12/1992 |
| JP | 6-48725 | 2/1994 |
| JP | 05-057194 | 9/1994 |
| WO | WO-99/56859 | 11/1999 |
| WO | WO-03/035549 A1 | 5/2003 |
| WO | WO-2007/004774 A1 | 1/2007 |
| WO | WO-2007/005308 A2 | 1/2007 |
| WO | WO-2008/019585 A1 | 2/2008 |
| WO | WO-2008/118434 A1 | 10/2008 |
| WO | WO-2008/132452 A2 | 11/2008 |

OTHER PUBLICATIONS

Ishihara et al., "Selective reduction of Nitrogen Monoxide with Propane over Cu-Silicoaluminophosphate (SAPO) under Oxidizing atmosphere", Chemistry Letters, 2119-2122, 1992.*
Li, Yuejin et al., "Selective NH3 Oxidation to N2 in a Wet Stream", *Applied Catalysis B: Environmental 13*, (1997), 131-139 pp.
Rebrov, E. V., et al., "Development of the Kinetic Model of Platinum Catalyzed Ammonia Oxidation in a Microreactor", *Chemical Engineering Journal 90*, (2002), 61-76 pp.
Baerlocher, CH. et al., "Atlas of Zeolite Framework Types", *Elsevier—Fifth Revised Edition*, (2001), 5 pages.
Medros, F. G., et al., "Dual-Catalyst System to Broaden the Window of Operability in the Reduction of NOx with Ammonia", *Ind. Eng. Chem. Res. 28*, (1989), 1171-1177 pp.
Akolekar, Deepak B., et al., "FTIR Investigations of the Absorption and Disproportionation of NO on Cu-Exchanged Silicoaluminophosphate of Type 34", *J. Chem. Soc. , Faraday Trans.*, 94(1), (1998), 155-160 pp.
Torre-Abreu, C. et al., "Selective Catalytic Reduction of NO on Copper-Exchanged Zeolites: The Role of the Structure of the Zeolite in the Nature of Copper-Active Sites", *Catalysis Today 54*, (1999), 407-418 pp.
PCT International Search Report for PCT/US2008/055148, 7 pp., Oct. 2008.
PCT Written Opinion for PCT/US2008/055148, 6 pp., Feb. 2007.
Prakash, A. M., et al., "Synthesis of SAPO-34: High Silicon Incorporation in the Presence of Morpholine as Template", *J. Chem. Soc. Faraday Trans.* 90(15), (1994), 2291-2296 pp.
Uzunova, Ellie L., et al., "Adsorption of NO on Cu-SAPO-34 and Co-SAPO-34; A Periodic DFT Study",*J. Phys. Chem C 2008*,(2008), 2632-2639 pp.
Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Eng. Chem. Res.*, 36, (1997), 17-22 pp.
Palella, B. I., et al., "On the hydrothermal stability of CuAPSO-34 microporous catalysts for N2O decomposition: a comparison with CuZSM-5", *Journal of Catalysts 217—Academic Press*, (2003), 100-106 pp.
Frache, A. et al., "Spectroscopic characterisation of microporous aluminophosphate materials with potential application in environmental catalysis", *Catalysis Today 77*, (2003), 371-384 pp.
Frache, A. et al., "Synthesis, Spectroscopic and Catalytic Properties of Cobalt and Copper Ions in Aluminophosphates with Chabasite-Like Structure, Studies of the NO Reactivity", *Studies in Surface Science and Catalysis 140*, (2001), 269-277 pp.
Frache, A. et al., "Catalytic DeNOx activity of cobalt and copper ions in microporous MeALPO-34 and MeAPSO-34", *Catalysis Today 75*, (2002), 359-365 pp.
Treacy, M.M. J., et al., "Proceedings of the 12th International Zeolite Conference", *Materials Research Society Conference Proceedings IV*, (Jul. 5-10, 1998), 6 pp.
Akolekar, Deepak B., et al., "FTIR investigations of the adsorption and disproportionation of NO on Cu-exchanged silicoaluminophosphate of type 34", *J. Chem. Soc., Faraday Trans.*, 94(1), (1998), 155-160 pp.
Barger, Paul T., et al., "Hydrothermal Stability of SAPO-34 in the Methanol-to-Olefins Process", *Tha Arabian Journal for Science and Engineering*, vol. 21, No. 2, (Apr. 1996), 10 pp.
Marchese, L. et al., "ALPO-34 and SAPO-34 synthesized by using morpholine as templating agent. FTIR and FT-Raman studies of the host-guest and guest-guest interactions within the zeolitic framework", *Microporous and Mesoporous Materials 30*, (1999), 145-153 pp.
Ishihara, Tatsumi et al., "Copper Ion-Exchanged SAPO-34 as a Thermostable Catalyst for Selective Reduction of NO with C3H6", *Journal of Catalysis 169*, Article No. CA971681, (1997), 93-102 pp. Fourth International Congress on Catalysis and Automotive Pollution Control, (Apr. 1997), 7 pp.
Palella, B. I., et al., "On the hydrothermal stability of CuAPSO-34 mircoporous catalysts for N2O decomposition: a comparison with CuZSM-5", *Journal of Catalysis 217*, (2003), 100-106 pp.
Chen, Jiesheng et al., "Silicoaluminophosphate number eighteen (SAPO-18): a new mircoporous solid acid catalyst", *Catalysis Letters 28*, (1994), 241-248 pp.
Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Datalysis*, vol. 84, (1994), 1493-1500 pp.
Frache, A. et al., "CuAPSO-34 catalysts for N2O decomposition in the presence of H2O. A study of zeolite structure stability in comparison to Cu-SAPO-34 and Cu-ZSM-5", *Topics in Catalysis* vol. 22, Nos. 1/2, (2003), 5 pp.
Zelenka, P. et al., "Exhaust gas aftetreatment systems for diesel engines with respect to future emission legislation", 13 pp., 1993.
USPTO Non-Final Office Action mailed Jan. 13, 2009 for U.S. Appl. No. 12/038,423, filed Feb. 27, 2008, 1-9 pp.
Chinese Journal of Catalysis, *Thermal and Hydrothermal Stability of SAPO-34 Molecular Sieve*, vol. 17, No. 6, (Nov. 1996), 9 pgs.
PCT International Search Report and Written Opinion in PCT/US2009/032610, (Jul. 16, 2009), 20 pgs.
Machine Translation of DE 3941541 A1, (Jun. 28, 1990), 8 pgs.
Centi, G. et al., "Role of the Nature of Copper Sites in the Activity of Copper-Based Catalyst for NO Conversion", *Research on Chemical Intermediates*, 17, (1992), 125-135 pgs.
Action Closing Prosecution in U.S. Appl. No. 95/001,453, mailed Nov. 18, 2011, 102 pgs.
Non-Final Office Action in U.S. Appl. No. 12/970,545, mailed Dec. 5, 2011, 21 pgs.
Non-Final Office Action in U.S. Appl. No. 12/970,582, mailed Dec. 7, 2011, 25 pgs.

Centi, Gabriele et al., "Sustainable Industrial Processes", 81 pgs.
Dedecek, Jiri et al., "Effect of Framework Charge Density on Catalytic Activity of Copper Loaded molecular Sieves of Chabazite Structure in Nitrogen(II) Oxide Decomposition", *Molecular Sieves of Chabazite Structure* Feb. 23, 2000, 343-351.
Halasz, J. et al., "Selective Reduction of NO Over Copper-Containing Modified Zeolites", *Studies in Surface Science and Catalysis*, vol. 96 1995, 675-685.
Heck, Ronald M. et al., "Catalytic Air Pollution Control—Commercial Technology", *Second Edition* 2002, 9 pgs.
Ishihara, Tatsumi et al., "Selective Reduction of Nitrogen Monoxide with Propene Over Cu-Silico-aluminophosphate (SAPO) Under Oxidizing Atmosphere", *Chemistry Letters, The Chemical Society of Japan* 1992, 2119-2122.
Korhonen, Satu T. et al., "Isolated Cu2+ ions: active sites for selective catalytic reduction of NO+", *ChemComm* Nov. 15, 2010, 3 pgs.
McEwen, Jean-Sabin et al., "Selective Catalytic Reduction of NOx by ammonia on metal-exchanged zeolite catalysts", *Prepr. Pap-Am. Chem. Soc., Div. Fuel Chem.*, 55 2011, 2 pgs.
Final Office Action in U.S. Appl. No. 12/612,142, mailed Jun. 10, 2011, 21 pgs.
Anderson, Paul J. et al., "Small pore molecular sieve supported transition metal catalysts for the selective catalytic reduction of NOx with $NH_3$", Abstract, 1 pg.
Schmieg, Steven J., et al., "Thermal Durability of $NH_3$-SCR Catalysts for Diesel NOx Reduction", 1 pgs.
Deka, U., et al, "Insight into the nature of the active site in Cu-CHA for $NH_3$-SCR", University Utrecht, Netherlands, 1 pgs.
Non-Final Office Action in U.S. Appl. No. 12/361,980, mailed Mar. 23, 2011, 24 pgs.
"Chinese Journal of Catalysis", *Thermal and Hydrothermal Stability of SAPO-34 Molecular Sieve*, vol. 17, No. 6 Nov. 1996, 9 pgs.
Final Office Action in U.S. Appl. No. 12/280,360, dated Jul. 26, 2010, 11 pgs.
"Fourth International Congress on Catalysis and Automotive Pollution Control", Apr. 1997, 7.
Gabriele Centi Declaration of Sep. 22, 2010, 11 pgs.
Machine Translation from EPO of DE 394541 A1, 8 pgs.
Non-Final Office Action in U.S. Appl. No. 12/361,980, mailed Sep. 22, 2010, 26 pgs.
PCT International Search Report and Written Opinion in PCT/US2009/032610, Jul. 16, 2009, 20 pgs.
PCT International Search Report and Written Opinion for PCT/US2008/055140, 11.
Reexam Order in Pat. No. 7,601,662, 18 pgs.
Reexamination Request in Pat. No. 7,601,662, 35 pgs.
Request for Inter Partes Reexamination, dated Sep. 28, 2010, 77 pgs.
U.S. Appl. No. 10/634,659, filed Aug. 5, 2003.
Non-Final Office Action mailed Jan. 13, 2009 for U.S. Appl. No. 12/038,423 filed mailed Jan. 13, 2009, 16 pgs.
Akolekar, Deepak B. et al., "FTIR investigations of the adsorption and disproportionation of NO on Cu-exchanged silicoaluminophosphate of type 34", *J. Chem. Soc., Faraday Trans.*, 94(1) 1998, 155-160.
Amiridis, Michael D. et al., "Selective catalytic reduction of nitric oxide by hydrocarbons", *Applied Catalysis* 1996, 203-227 pgs.
Ashtekar, Sunil et al., "Small-Pore Molecular Sieves SAPO-34 and SAPO-44 with Chabazite Structure: A Study of Silicon Incorporation", *J. Phys. Chem. 1994*, 98 1994, 4878-4883.
Baerlocher, CH. et al., "Atlas of Zeolite Framework Types", *Elsevier—Fifth Revised Edition* 2001, 5 pages.
Barger, Paul T. et al., "Hydrothermal Stability of SAPO-34 in the Methanol-to-Olefins Process", *Tha Arabian Journal for Science and Engineering*, vol. 21, No. 2 Apr. 1996, 10.
Barthomeuf, Denise, "Journal: NATO ASI Series, Series C: Mathematical and Physical Sciences Issue 444", *Generation of acidity (amount and strength) in siliconaluminophosphates (SAPO zeolites), Examples of SAPO-5* ; pp. 375-390 1994, 17 pgs.
Breck, Donald W., "Zeolite Molecular Sieves", *John Wiley & Sons, A Wiley-Interscience Publication* 1974, 6 pgs.
Centi, G. et al., "Role of the Nature of Copper Sites in the Activity of Copper-Based Catalysts for NO Conversion", *Research on Chemical Intermediates*, 17 1992, 125-135 pgs.

Chen, Jiesheng et al., "Silicoaluminophosphate number eighteen (SAPO-18): a new mircoporous solid acid catalyst", *Catalysis Letters 28* 1994, 241-248.
Chung, Sung Y. et al., "Effect of Si/Alratio of Mordenite and ZSM-5 type Zeolite Catalysts on Hydrothermal Stability for NO Reduction by Hydrocarbons", *Studies in Surface Science Catalysis*, vol. 130 2000, 1511-1516.
Dedecek, Jiri et al., "Effect of Framework Charge Density on Catalytic Activity of Copper Loaded Molecular Sieves of Chabazite Structure in Nitrogen (II) Oxide Decomposition", *Collect. Czech. Chem. Commun.* (vol. 65) 2000, 343-351 pgs.
Dedecek, J. et al., "Siting of the Cu+ ions in dehydrated ion exchanged synthetic and natural chabasites: a Cu+ photoluminescence study", *Microporous and Mesoporous Materials 32* 1999, 13 pgs.
Frache, A. et al., "Catalytic DeNOx activity of cobalt and copper ions in microporous MeALPO-34 and MeAPSO-34", *Catalysis Today 75* 2002, 359-365.
Frache, A. et al., "CuAPSO-34 catalysts for N2O decomposition in the presence of H2O. A study of zeolite structure stability in comparison to Cu-SAPO-34 and Cu-ZSM-5", *Topics in Catalysis* vol. 22, Nos. 1/2 2003, 5.
Frache, A. et al., "Spectroscopic characterisation of microporous aluminophosphate materials with potential application in environmental catalysis", *Catalysis Today 77* 2003, 371-384.
Frache, A. et al., "Synthesis, Spectroscopic and Catalytic Properties of Cobalt and Copper Ions in Aluminophosphates with Chabasite-Like Structure, Studies of the NO Reactivity", *Studies in Surface Science and Catalysis 140* 2001, 269-277.
Hartmann, Martin et al., "Transition-Metal Ions in Aluminophosphate and Silicoaluminophosphate Molecular Sieves: Location, Interaction with Adsorbates and Catalytic Properties", *Chem. Rev. 99* (3) 1999, 635-663.
Heck, Ronald M. et al., "Catalytic Air Pollution Control", *A John Wiley & Sons, Inc., Publication—Wiley-Interscience* 2002, 3 pgs.
Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Catalysis*, vol. 84 (1994), 1493-1500.
Ishihara, Tatsumi et al., "Copper Ion-Exchanged SAPO-34 as a Thermostable Catalyst for Selective Reduction of NO with C3H6", *Journal of Catalysis*, vol. 169 1997, 10 pgs.
Ishihara, Tatsumi et al., "Selective Reduction of Nitrogen Monoxide with Propene over Cu-Silico-aluminophosphate (SAPO) under Oxidizing Atmosphere", *The Chemical Society of Japan* (1992), 2119-2122.
Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Eng. Chem. Res.*, 36 1997, 17-22.
Kim, Moon Hyeon, et al., "Water Tolerance of $DeNO_x$ SCR Catalysts Using Hydrocarbons: Findings, Improvements and Challenges", *Korean J. Chem. Eng.* 18(5) 2001, 725-740 pgs.
Kwak, Ja H. et al., "Excellent activity and selectivity of Cu-SSZ-13 in the selective catalytic reduction of NOx with NH3", *Journal of Catalysis* 2010, 4 pgs.
Li, Yuejin et al., "Selective NH3 Oxidation to N2 in a Wet Stream", *Applied Catalysis B: Environmental 13* 1997, 131-139.
Lok, B. M. et al., "Silicoaluminophosphate Molecular Sieves: Another New Class of Microporous Crystalline Inorganic Solids", *Journal of the American Chemical Society*, vol. 106 1984, 6092-6093.
Marchese, L. et al., "ALPO-34 and SAPO-34 synthesized by using morpholine as templating agent. FTIR and FT-Raman studies of the host-guest and guest-guest interactions within the zeolitic framework", *Microporous and Mesoporous Materials 30* 1999, 145-153.
Medros, F. G. et al., "Dual-Catalyst System to Broaden the Window of Operability in the Reduction of NOx with Ammonia", *Ind. Eng. Chem. Res.* 28 1989, 1171-1177.
Miller, William R. et al., "Urea selective catalytic reduction", *2010 Factiva, Inc.* 2000, 9 pgs.

Misono, Makoto, "Catalytic reduction of nitrogen oxides by bifunctional catalysts", *Baltzer Science Publishers* vol. 2, No. 2 Dec. 1998, 24 pgs.

Palella, B. I. et al., "On the hydrothermal stability of CuAPSO-34 mircoporous catalysts for N2O decomposition: a comparison with CuZSM-5", *Journal of Catalysis 217* 2003, 100-106.

Prakash, A M. et al., "Synthesis of SAPO-34: High Silicon Incorporation in the Presence of Morpholine as Template", *J. Chem. Soc. Faraday Trans. 1994*, 90(15) 1994, 2291-2296.

Rebrov, E. V. et al., "Development of the Kinetic Model of Platinum Catalyzed Ammonia Oxidation in a Microreactor", *Chemical Engineering Journal 90* 2002, 61-76.

Torre-Abreu, C. et al., "Selective Catalytic Reduction of NO on Copper-Exchanged Zeolites: The Role of the Structure of the Zeolite in the Nature of Copper-Active Sites", *Catalysis Today 54* 1999, 407-418.

Treacy, M.M. J. et al., "Proceedings of the 12th International Zeolite Conference", *Materials Research Society Conference Proceedings IV* Jul. 5-10, 1998, 6.

Uzunova, Ellie L. et al., "Adsorption of NO on Cu-SAPO-34 and Co-SAPO-34; A Periodic DFT Study", *J. Phys. Chem C 2008* 2008, 2632-2639.

Watanabe, Yoshihide et al., "Multinuclear NMR Studies on the Thermal Stability of SAPO-34", *Journal of Catalysis* 1993, 430-436 pgs.

Zelenka, P. et al., "Exhaust gas aftetreatment systems for diesel engines with respect to future emission legislation", *Diesel Engine Technology 96* May 1993, 13 pgs.

Declaration by Gabriele Centi, PH.D, 48 pgs.

Declaration by Johannes A. Lercher, PH.D., 13 pgs.

Declaration by Wolfgang Strehlau, PH.D., 18 pgs.

Third Party Comments After Patent Owner's Response After ACP Under 37 CFR 1.951, dated Jan. 18, 2012, 40 pgs.

Non-Final Office Action in U.S. Appl. No. 12/038,423 mailed Jan. 13, 2009, 16 pgs.

Non-Final Office Action in U.S. Appl. No. 12/480,360, dated Feb. 26, 2010, 19 pgs.

Non-Final Office Action in U.S. Appl. No. 12/612,142, mailed Dec. 29, 2010, 26 pgs.

Brandenberger, Sandro et al., "The State of the Art in Selective Catalytic Reduction of NOx by Ammonia Using Metal-Exchanged Zeolite Catalysts", *Catalysis Reviews 50:4* 2008, 41 pgs.

Breck, Donald W., "Zeolite Molecular Sieves", *John Wiley & Sons, A Wiley-Interscience Publication* 1974, 7 pgs.

Cavataio, Giovanni et al., "Cu/Zeolite SCR on High Porosity Filters: Laboratory and Engine Performance Evaluations", *SAE International, Ford Motor Company* 2009, 10 pgs.

Cavataio, Giovanni et al., "Development of Emission Transfer Functions for Predicting the Deterioration of a Cu-Zeolite SCR Catalyst", *SAE International, Ford Motor Company* 2009, 1-17.

Cavataio, Giovanni et al., "Enhanced Durability of a Cu/Zeolite Based SCR Catalyst", *SAE Int. J. Fuels Lubr*, vol. 1, Issue 1 2008, 477-487.

Cavataio, Giovanni et al., "Laboratory Testing of Urea-SCR Formulations to Meet Tier 2 Bin 5 Emissions", *SAE International, 2007 World Congress* 2007, 16 pgs.

Centi, Gabriele et al., "Nature of active species in copper-based catalysts and their chemistry of transformation of nitrogen oxides", *Applied Catalysts A: General 132* 1995, 179-259.

Centi, G., "Review Paper on Zeolites in Corma Treatise", *Zeolites and Catalysts*, vol. 1, 51 pgs.

Chang, Russell et al., "Thermal durabiluty and deactivation of Cuzeolite SCR catalysts", *Johnson Matthey Inc.* , 1 pgs.

Cheng, Yisun et al., "Sulfur Tolerance and DeSOx Studies on Diesel SCR Catalysts", *SAE Int. J. Fuels Lubr.*, vol. 1, Issue 1 2008, 471-476.

Cheng, Yisun et al., "The Effects of SO2 and SO3 Poisoning on Cu/Zeolite SCR Catalysts", *SAE International* 2009, 7 pgs.

Fickel, Dustin W. et al., "Copper Coordination in Cu-SSZ-13 and Cu-SSZ-16 Investigated by Variable-Temperature XRD", *J. Phys. Chem C*, 114 2010, 1633-1640.

Fickel, Dustin W., "Investigating the High-Temperature Chemistry of Zeolites: Dehydrogenation of Zeolites and NH3-SCR of Copper Exchanged Small-Pore Zeolites", *Dissertation* 2010, 1-199.

Girard, James et al., "Influence of Hydrocarbon Storage on the Durabiluty of SCR Catalysts", *SAR International, 2008 World Congress* 2008, 10 pgs.

Long, R. Q. et al., "Selective Catalytic Oxidation (SCO) of Ammonia to Nitrogen over Fe-Exchanged Zeolites", *Journal of Catalysis 201* 2001, 145-152.

Pelella, B. I. et al., "Enhancement of Hydrothermal Stability of Cu-ZSM5 Catalyst for NO Decomposition", *Kinetics and Catalysis*, vol. 47, No. 5 2006, 728-736.

Pluth, J. J. et al., "Positions of Cations and Molecules in Zeolites with the Chabazite Framework. IV Hydrated and Dehydrated Cu2+-Exchanged Chabazite", *Mat. Res. Bull,*, vol. 12 1977, 1001-1007.

Qi, Gongshin et al., "Selective Catalytic Reduction of Nitric Oxide with Ammonia over ZSM-5 Based Catalysts for Diesel Engine Applications", *Catal Lett 121* 2008, 111-117.

Rahkamaa-Tolonen, Katariina et al., "The effect of NO2 on the activity of fresh and aged zeolite catalysts in the NH3-SCR reaction", *Catalysts Today*, 100 2005, 217-222.

Xu, Lifeng et al., "Impact of a Cu-zeolite SCR Catalyst on the Performance of a Diesel LNT+SCR System", *SAE International* 2009, 12 pgs.

Final Office Action in U.S. Appl. No. 12/970,582, dated Mar. 26, 2012, 13 pgs.

Non-Final Office Action in U.S. Appl. No. 12/970,545, dated Mar. 20, 3012, 14 pgs.

Action Closing Prosecution in U.S. Appl. No. 95/001,453, mailed May 11, 2012, 69 pgs.

"Brief on Appeal-Requester", Control No. 95/001,453 Jun. 14, 2012, 48 pgs.

"Declaration (G) by Alexander Green, Ph.D., Under 37 C.F.R. § 1.132", Control No. 95/001,453 Sep. 12, 2012 , 8 pgs.

Non-Final Office Action in U.S. Appl. No. 13/214,391, dated Oct. 26, 2012, 37 pgs.

* cited by examiner

PROCESSES FOR REDUCING NITROGEN OXIDES USING COPPER CHA ZEOLITE CATALYSTS

CROSS-REFERENCE TO RELATED APPLICATIONS

This application is a divisional of U.S. patent application Ser. No. 12/038,423, filed on Feb. 27, 2008 now U.S. Pat. No. 7,601,662, which claims the benefit of priority under 35 U.S.C. §119(e) to U.S. Provisional Application No. 60/891,835, filed on Feb. 27, 2007, the contents of each of which is hereby incorporated by reference in its entirety.

TECHNICAL FIELD

Embodiments of the invention relate to zeolites that have the CHA crystal structure, methods for their manufacture, and catalysts comprising such zeolites. More particularly, embodiments of the invention pertain to copper CHA zeolite catalysts and methods for their manufacture and use in exhaust gas treatment systems.

BACKGROUND ART

Zeolites are aluminosilicate crystalline materials having rather uniform pore sizes which, depending upon the type of zeolite and the type and amount of cations included in the zeolite lattice, typically range from about 3 to 10 Angstroms in diameter. Both synthetic and natural zeolites and their use in promoting certain reactions, including the selective reduction of nitrogen oxides with ammonia in the presence of oxygen, are well known in the art.

Metal-promoted zeolite catalysts including, among others, iron-promoted and copper-promoted zeolite catalysts, for the selective catalytic reduction of nitrogen oxides with ammonia are known. Iron-promoted zeolite beta has been an effective catalyst for the selective reduction of nitrogen oxides with ammonia. Unfortunately, it has been found that under harsh hydrothermal conditions, such as reduction of NOx from gas exhaust at temperatures exceeding 500° C., the activity of many metal-promoted zeolites begins to decline. This decline in activity is believed to be due to destabilization of the zeolite such as by dealumination and consequent reduction of metal-containing catalytic sites within the zeolite. To maintain the overall activity of NOx reduction, increased levels of the iron-promoted zeolite catalyst must be provided. As the levels of the zeolite catalyst are increased to provide adequate NOx removal, there is an obvious reduction in the cost efficiency of the process for NOx removal as the costs of the catalyst rise.

There is a desire to prepare materials which offer low temperature SCR activity and/or improved hydrothermal durability over existing zeolites, for example, catalyst materials which are stable at temperatures up to at least about 650° C. and higher.

SUMMARY

Aspects of the invention are directed to zeolites that have the CHA crystal structure (as defined by the International Zeolite Association), catalysts comprising such zeolites, and exhaust gas treatments incorporating such catalysts. The catalyst may be part of an exhaust gas treatment system used to treat exhaust gas streams, especially those emanating from gasoline or diesel engines.

One embodiment of the present invention pertains to copper CHA catalysts and their application in exhaust gas systems such as those designed to reduce nitrogen oxides. In specific embodiments, novel copper chabazite catalysts are provided which exhibit improved $NH_3$ SCR of NOx. The copper chabazite catalysts made in accordance with one or more embodiments of the present invention provide a catalyst material which exhibits excellent hydrothermal stability and high catalytic activity over a wide temperature range. When compared with other zeolitic catalysts that find application in this field, such as Fe Beta zeolites, copper CHA catalyst materials according to embodiments of the present invention offer improved low temperature activity and hydrothermal stability.

One embodiment of the invention relates to a catalyst comprising a zeolite having the CHA crystal structure and a mole ratio of silica to alumina greater than about 15 and an atomic ratio of copper to aluminum exceeding about 0.25. In a specific embodiment, the mole ratio of silica to alumina is from about 15 to about 256 and the atomic ratio of copper to aluminum is from about 0.25 to about 0.50. In a more specific embodiment, the mole ratio of silica to alumina is from about 25 to about 40. In an even more specific embodiment, the mole ratio of silica to alumina is about 30. In one particular embodiment, the atomic ratio of copper to aluminum is from about 0.30 to about 0.50. In a specific embodiment, the atomic ratio of copper to aluminum is about 0.40. In a specific embodiment, the mole ratio of silica to alumina is from about 25 to about 40 and the atomic ratio of copper to aluminum is from about 0.30 to about 0.50. In another specific embodiment, the silica to alumina is about 30 and the atomic ratio of copper to alumina is about 0.40.

In a particular embodiment, the catalyst contains ion-exchanged copper and an amount of non-exchanged copper sufficient to maintain NOx conversion performance of the catalyst in an exhaust gas stream containing nitrogen oxides after hydrothermal aging of the catalyst. In one embodiment, the NOx conversion performance of the catalyst at about 200° C. after aging is at least 90% of the NOx conversion performance of the catalyst at about 200° C. prior to aging. In a particular embodiment, the catalyst contains at least about 2.00 weight percent copper oxide.

In at least one embodiment, the catalyst is deposited on a honeycomb substrate. In one or more embodiments, the honeycomb substrate comprises a wall flow substrate. In other embodiments, the honeycomb substrate comprises a flow through substrate. In certain embodiments, at least a portion of the flow through substrate is coated with CuCHA adapted to reduce oxides of nitrogen contained in a gas stream flowing through the substrate. In a specific embodiment, at least a portion of the flow through substrate is coated with Pt and CuCHA adapted to oxidize ammonia in the exhaust gas stream.

In embodiments that utilize a wall flow substrate, at least a portion of the wall flow substrate is coated with CuCHA adapted to reduce oxides of nitrogen contained in a gas stream flowing through the substrate. In other embodiments, at least a portion of the wall flow substrate is coated with Pt and CuCHA adapted to oxidize ammonia in the exhaust gas stream.

In a specific embodiment, a catalyst article comprises a honeycomb substrate having a zeolite having the CHA crystal structure deposited on the substrate, the zeolite having a mole ratio of silica to alumina greater than about 15 and an atomic ratio of copper to aluminum exceeding about 0.25 and containing an amount of free copper exceeding ion-exchanged copper. In one embodiment, the free copper is present in an amount sufficient to prevent hydrothermal degradation of the nitrogen oxide conversion of the catalyst. In one or more embodiments, the free copper prevents hydrothermal degradation of the nitrogen oxide conversion of the catalyst upon hydrothermal aging. The catalyst may further comprise a binder. In particular embodiments, the ion-exchanged copper is exchanged using copper acetate.

Other aspects of the invention relate to exhaust gas treatment systems incorporating catalysts of the type described above. Still other aspects relate to a process for the reduction of oxides of nitrogen contained in a gas stream in the presence of oxygen wherein said process comprises contacting the gas stream with the catalyst described above.

Another aspect pertains to an exhaust gas treatment system comprising an exhaust gas stream containing NOx, and a catalyst described above effective for selective catalytic reduction of at least one component of NOx in the exhaust gas stream. Still another aspect pertains to an exhaust gas treatment system comprising an exhaust gas stream containing ammonia and a catalyst as described above effective for destroying at least a portion of the ammonia in the exhaust gas stream.

DETAILED DESCRIPTION

Figure 1:
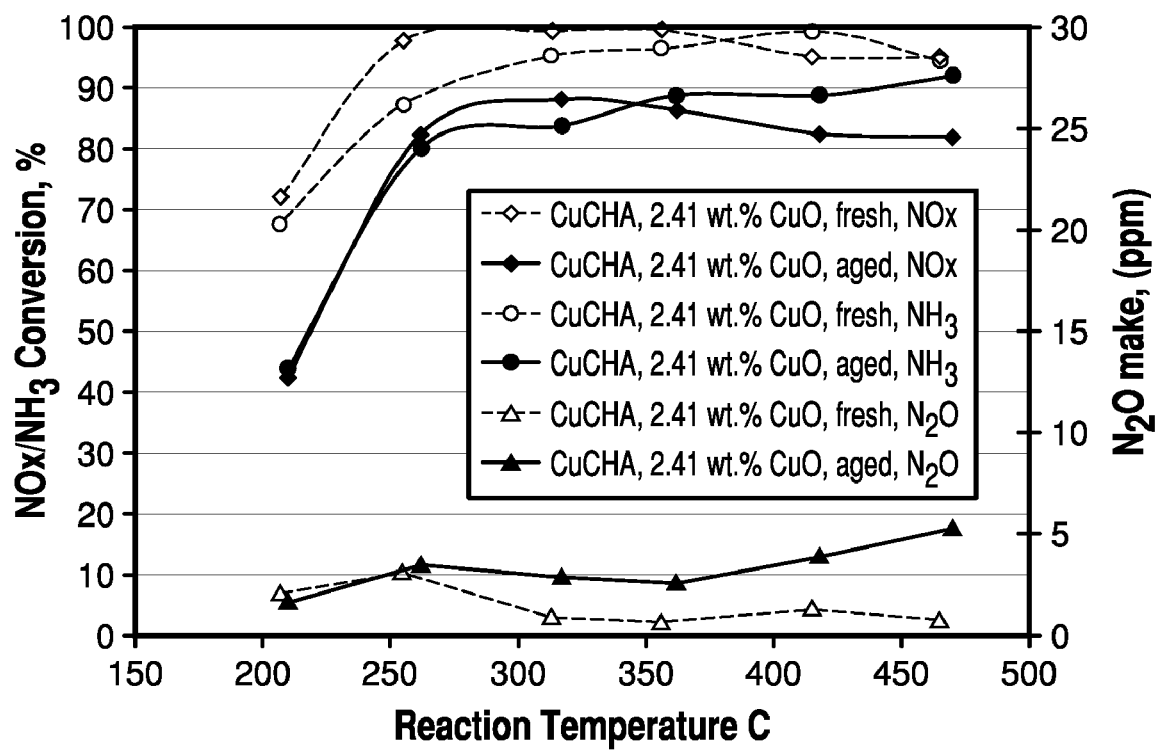
FIG. 1 is a graph depicting nitrogen oxides removal efficiency (%), ammonia consumption (%) and $N_2O$ generated (ppm) of CuCHA catalyst as a function of reaction temperatures for CuCHA prepared according to the methods of Example 1.

Before describing several exemplary embodiments of the invention, it is to be understood that the invention is not limited to the details of construction or process steps set forth in the following description. The invention is capable of other embodiments and of being practiced or being carried out in various ways.

In one embodiment of the invention, zeolites having the CHA structure such as chabazite are provided. In one or more embodiments, a zeolite having the CHA crystal structure and a mole ratio of silica to alumina greater than about 15 and an atomic ratio of copper to aluminum exceeding about 0.25 is provided. In specific embodiments, the mole ratio of silica to alumina is about 30 and the atomic ratio of copper to aluminum is about 0.40. Other zeolites having the CHA structure, include, but are not limited to SSZ-13, LZ-218, Linde D, Linde R, Phi, ZK-14, and ZYT-6.

Synthesis of the zeolites having the CHA structure can be carried out according to various techniques known in the art. For example, in a typical SSZ-13 synthesis, a source of silica, a source of alumina, and an organic directing agent are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate, and aluminum alkoxides. Sodium hydroxide is typically added to the reaction mixture, but is not required. A typical directing agent for this synthesis is adamantyltrimethylammonium hydroxide, although other amines and/or quaternary ammonium salts may be substituted or added to the latter directing agent. The reaction mixture is heated in a pressure vessel with stirring to yield the crystalline SSZ-13 product. Typical reaction temperatures are in the range of 150 and 180° C. Typical reaction times are between 1 and 5 days.

At the conclusion of the reaction, the product is filtered and washed with water. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 700° C. range.

CuCHA zeolite catalysts in accordance with one or more embodiments of the invention can be utilized in catalytic processes which involve oxidizing and/or hydrothermal conditions, for example in temperatures in excess of about 600° C., for example, above about 800° C. and in the presence of about 10% water vapor. More specifically, it has been found that CuCHA zeolite catalysts which have been prepared in accordance with embodiments of the invention have increased hydrothermal stability compared to CuY and CuBeta zeolites. CuCHA zeolite catalysts prepared in accordance with embodiments of the invention yield improved activity in the selective catalytic reduction of NOx with ammonia, especially when operated under high temperatures of at least about 600° C., for example, about 800° C. and higher, and high water vapor environments of about 10% or more. CuCHA has high intrinsic activity that enables use of lower amounts of catalyst material, which in turn should reduce backpressure of honeycomb substrates coated with washcoats of CuCHA catalysts. In one or more embodiments, hydrothermal aging refers to exposure of catalyst to a temperature of about 800° C. in a high water vapor environments of about 10% or more, for at least about 5 to about 25 hours, and in specific embodiments, up to about 50 hours.

Embodiments of this invention also pertain to a process for abatement of $NO_x$ in an exhaust gas stream generated by an internal combustion engine utilizing CuCHA zeolite catalysts having a mole ratio of silica to alumina greater than about 15 and an atomic ratio of copper to aluminum exceeding about 0.25. Other embodiments pertain to SCR catalysts comprising a CuCHA zeolite catalyst having a mole ratio of silica to alumina greater than about 15 and an atomic ratio of copper to aluminum exceeding about 0.25, and exhaust gas treatment systems incorporating CuCHA zeolite catalysts. Still other embodiments pertain to ammonia oxidation (AMOX) catalysts and exhaust gas treatment systems incorporating AMOX catalyst comprising a CuCHA zeolite catalyst having a mole ratio of silica to alumina greater than about 15 and an atomic ratio of copper to aluminum exceeding about 0.25. According to one or more embodiments, catalysts and systems utilize CuCHA catalysts having ion-exchanged copper and sufficient excess free copper to prevent thermal degradation of the catalysts when operated under high temperatures of at least about 600° C., for example, about 800° C. and higher, and high water vapor environments of about 10% or more.

Experimentation has indicated that improved performance of catalysts in accordance with embodiments of the invention is associated with Cu loading. While Cu can be exchanged to increase the level of Cu associated with the exchange sites in the structure of the zeolite, it has been found that it is beneficial to leave non-exchanged Cu in salt form, for example, as $CuSO_4$ within the zeolite catalyst. Upon calcination, the copper salt decomposes to CuO, which may be referred to herein as "free copper" or "soluble copper." According to one or more embodiments, this free Cu is both active and selective, resulting in low $N_2O$ formation when used in the treatment of a gas stream containing nitrogen oxides. Unexpectedly, this "free" Cu has been found to impart greater stability in catalysts subjected to thermal aging at temperatures up to about 800° C.

While embodiments of the invention are not intended to be bound by a particular principle, it is believed that the relatively small channel openings of CHA do not permit large molecular weight hydrocarbons (HCs) typical of diesel fuel to enter and adsorb within the CuCHA structure. Unlike other zeolites like Beta or ZSM5, CHA catalysts prepared according to embodiments of the invention have a relatively low affinity for adsorbing these large molecular weight HC species. This is a beneficial property for use in selective catalytic reduction (SCR) catalysts.

In systems that utilize an SCR downstream from a diesel oxidation catalyst (DOC), the properties of the CuCHA catalysts provide one or more beneficial results according to embodiments of the invention. During start-up and prolonged low temperature operation, the SCR only or a diesel oxidation catalyst (DOC) or DOC and catalyzed soot filter (CSF) upstream of the CuCHA SCR are not fully activated to oxidize the HCs. In accordance with one or more embodiments, because the CuCHA SCR catalyst is not influenced by HCs at low temperature, it remains active over a wider range of the low temperature operation window. According to one or more embodiments, low temperature refers to temperatures about 250° C. and lower.

According to one or more embodiments, the CuCHA catalysts operate within a low temperature window. Over time in an exhaust gas treatment system having a DOC pre-catalyst downstream from the engine followed by an SCR catalyst and a CSF, or a DOC pre-catalyst upstream from a CSF and SCR, the DOC will tend to activate for both low temperature light-off and HC fuel burning. In such systems, it is beneficial if the SCR catalyst can maintain its ability to operate at low temperatures. Since the oxidation catalysts will lose their ability to oxidize NO to $NO_2$, it is useful to provide an SCR catalyst that can treat NO as effectively as $NO_2$. CuCHA catalysts produced in accordance with embodiments of the invention have the ability to reduce NO with $NH_3$ at low temperatures. This attribute can be enhanced by the addition of non-exchanged Cu to the zeolite catalyst.

According to embodiments of the invention, the SCR catalyst can be in the form of self supporting catalyst particles or as a honeycomb monolith formed of the SCR catalyst composition. In one or more embodiments of the invention however, the SCR catalyst composition is disposed as a washcoat or as a combination of washcoats on a ceramic or metallic substrate, for example a honeycomb flow through substrate.

In a specific embodiment of an emissions treatment system the SCR catalyst is formed from a Cu exchanged CHA zeolite material having free copper in addition to ion-exchanged copper.

When deposited on the honeycomb monolith substrates, such SCR catalyst compositions are deposited at a concentration of at least about 0.5 $g/in^3$, for example, about 1.3 $g/in^3$ about 2.4 $g/in^3$ or higher to ensure that the desired NOx reduction is achieved and to secure adequate durability of the catalyst over extended use.

The term "SCR" catalyst is used herein in a broader sense to mean a selective catalytic reduction in which a catalyzed reaction of nitrogen oxides with a reductant occurs to reduce the nitrogen oxides. "Reductant" or "reducing agent" is also broadly used herein to mean any chemical or compound tending to reduce NOx at elevated temperature. In specific embodiments, the reducing agent is ammonia, specifically an ammonia precursor, i.e., urea and the SCR is a nitrogen reductant SCR. However, in accordance with a broader scope of the invention, the reductant could include fuel, particularly diesel fuel and fractions thereof as well any hydrocarbon and oxygenated hydrocarbons collectively referred to as an HC reductant.

Substrates

The catalyst compositions are disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). AMOX and/or SCR catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

In alternative embodiments, one or both of the CuCHA catalyst compositions may be deposited on an open cell foam substrate. Such substrates are well known in the art, and are typically formed of refractory ceramic or metallic materials.

Washcoat Preparation

According to one or more embodiments, washcoats of CuCHA can be prepared using a binder. According to one or more embodiments use of a $ZrO_2$ binder derived from a suitable precursor such as zirconyl acetate or any other suitable zirconium precursor such as zirconyl nitrate. In one embodiment, zirconyl acetate binder provides a catalytic coating that remains homogeneous and intact after thermal aging, for example, when the catalyst is exposed to high temperatures of at least about 600° C., for example, about 800° C. and higher, and high water vapor environments of about 10% or more. Keeping the washcoat intact is beneficial because loose or free coating could plug the downstream CSF causing the backpressure to increase.

According to one or more embodiments, CuCHA catalysts can be used as an ammonia oxidation catalyst. Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a zeolite.

As is known in the art, to reduce the emissions of nitrogen oxides from flue and exhaust gases, ammonia is added to the gaseous stream containing the nitrogen oxides and the gaseous stream is then contacted with a suitable catalyst at elevated temperatures in order to catalyze the reduction of nitrogen oxides with ammonia. Such gaseous streams, for example, the products of combustion of an internal combustion engine or of a gas-fueled or oil-fueled turbine engine, often inherently also contain substantial amounts of oxygen. A typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia.

Metal-promoted zeolites have been used to promote the reaction of ammonia with nitrogen oxides to form nitrogen and $H_2O$ selectively over the competing reaction of oxygen and ammonia. The catalyzed reaction of ammonia and nitrogen oxides is therefore sometimes referred to as the selective catalytic reduction ("SCR") of nitrogen oxides or, as sometimes herein, simply as the "SCR process". Theoretically, it would be desirable in the SCR process to provide ammonia in excess of the stoichiometric amount required to react completely with the nitrogen oxides present, both to favor driving the reaction to completion and to help overcome inadequate mixing of the ammonia in the gaseous stream. However, in practice, significant excess ammonia over such stoichiometric amount is normally not provided because the discharge of unreacted ammonia from the catalyst to the atmosphere would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream, resulting in the formation therein of channels of high ammonia concentration. Such channeling is of particular concern when utilizing catalysts comprising monolithic honeycomb-type carriers comprising refractory bodies having a plurality of fine, parallel gas flow paths extending therethrough because, unlike the case of beds of particulate catalyst, there is no opportunity for gas mixing between channels.

According to embodiments of the present invention CuCHA catalysts can be formulated to favor either (1) the SCR process, i.e., the reduction of nitrogen oxides with ammonia to form nitrogen and $H_2O$, or (2) the oxidation of ammonia with oxygen to form nitrogen and $H_2O$, the selectivity of the catalyst being tailored by controlling the Cu content of the zeolite. U.S. Pat. No. 5,516,497 teaches iron and copper loading levels on zeolites other than copper CHA to obtain selectivity for an SCR reaction and selectivity of the catalyst for the oxidation of ammonia by oxygen at the expense of the SCR process, thereby improving ammonia removal. In accordance with embodiments of the invention, CuCHA copper loading can be tailored to obtain selectivity for SCR reactions and oxidation of ammonia by oxygen and to provide exhaust gas treatment systems utilizing both types of catalyst.

The above principles are utilized by providing a staged or two-zone catalyst in which a first catalyst zone with copper loading on a zeolite, that promotes SCR followed by a second catalyst zone comprising a zeolite having thereon copper loading and/or a precious metal component that promotes oxidation of ammonia. The resultant catalyst composition thus has a first (upstream) zone which favors the reduction of nitrogen oxides with ammonia, and a second (downstream) zone which favors the oxidation of ammonia. In this way, when ammonia is present in excess of the stoichiometric amount, whether throughout the flow cross section of the gaseous stream being treated or in localized channels of high ammonia concentration, the oxidation of residual ammonia by oxygen is favored by the downstream or second catalyst zone. The quantity of ammonia in the gaseous stream discharged from the catalyst is thereby reduced or eliminated. The first zone and the second zones can be on a single catalyst substrate or as separate substrates.

It has been demonstrated that a CuCHA washcoat containing a precious metal, for example, Pt, provides an AMOX catalyst. It is expected that not only was ammonia in gas flowing through the catalyst destroyed, but there was continued removal of NOx by conversion to $N_2$. In a specific embodiment, the zeolite has a ratio of $SiO_2/Al_2O_3$ from about 15 to about 256, and an Al/M ratio between 2 and 10, wherein M represents the total Cu and precious metal. In one embodiment, the precious metal comprises platinum and the platinum content is between 0.02% and 1.0% by weight of the catalyst, and the part loading is from about 0.5 to about 5 g/in$^3$.

According to one or more embodiments of the invention, CuCHA SCR catalysts can be disposed on a wall-flow filter or catalyzed soot filter. CuCHA washcoats can be coated on a porous filter to provide for soot combustion, SCR and AMOX functions.

In one or more embodiments of the present invention, the catalyst comprises a precious metal component, i.e., a platinum group metal component. For example, as noted above, AMOX catalysts typically include a platinum component. Suitable precious metal components include platinum, palladium, rhodium and mixtures thereof. The several components (for example, CuCHA and precious metal component) of the catalyst material may be applied to the refractory carrier member, i.e., the substrate, as a mixture of two or more components or as individual components in sequential steps in a manner which will be readily apparent to those skilled in the art of catalyst manufacture. As described above and in the examples, a typical method of manufacturing a catalyst according to an embodiment of the present invention is to provide the catalyst material as a coating or layer of washcoat on the walls of the gas-flow passages of a suitable carrier member. This may be accomplished by impregnating a fine particulate refractory metal oxide support material, e.g., gamma alumina, with one or more catalytic metal components such as a precious metal, i.e., platinum group, compound or other noble metals or base metals, drying and calcining the impregnated support particles and forming an aqueous slurry of these particles. Particles of the bulk copper chabazite may be included in the slurry. Activated alumina may be thermally stabilized before the catalytic components are dispersed thereon, as is well known in the art, by impregnating it with, e.g., a solution of a soluble salt of barium, lanthanum, zirconium, rare earth metal or other suitable stabilizer precursor, and thereafter drying (e.g., at 110° C. for one hour) and calcining (e.g., at 550° C. for one hour) the impregnated activated alumina to form a stabilizing metal oxide dispersed onto the alumina. Base metal catalysts may optionally also have been impregnated into the activated alumina, for example, by impregnating a solution of a base metal nitrate into the alumina particles and calcining to provide a base metal oxide dispersed in the alumina particles.

The carrier may then be immersed into the slurry of impregnated activated alumina and excess slurry removed to provide a thin coating of the slurry on the walls of the gas-flow passages of the carrier. The coated carrier is then dried and calcined to provide an adherent coating of the catalytic component and, optionally, the copper CHA material, to the walls of the passages thereof. One or more additional layers may be provided to the carrier. After each layer is applied, or after a the number of desired layers is applied, the carrier is then dried and calcined to provide a finished catalyst member in accordance with one embodiment of the present invention.

Alternatively, the alumina or other support particles impregnated with the precious metal or base metal component may be mixed with bulk or supported particles of the copper chabazite material in an aqueous slurry, and this mixed slurry of catalytic component particles and copper chabazite material particles may be applied as a coating to the walls of the gas-flow passages of the carrier.

In use, the exhaust gas stream can be contacted with a catalyst prepared in accordance with embodiments of the present invention. For example, the CuCHA catalysts made in accordance with embodiments of the present invention are well suited to treat the exhaust of engines, including diesel engines.

Without intending to limit the invention in any manner, embodiments of the present invention will be more fully described by the following examples.

EXAMPLE 1

A CuCHA powder catalyst was prepared by mixing 100 g of $NH_4^+$-form CHA, having a silica/alumina mole ratio of 30, with 400 mL of a copper(II) sulfate solution of 1.0 M. The pH was adjusted to 3.5 with nitric acid. An ion-exchange reaction between the $NH_4^+$-form CHA and the copper ions was carried out by agitating the slurry at 80° C. for 1 hour. The resulting mixture was then filtered, washed with 800 mL of deionized water in three portions until the filtrate was clear and colorless, which indicated that substantially no soluble or free copper remained in the sample, and the washed sample was dried at 90° C. The above process including the ion-exchange, filtering, washing and drying was repeated once.

The resulting CuCHA product was then calcined at 640° C. in air for 6 hours. The obtained CuCHA catalyst comprised CuO at 2.41% by weight, as determined by ICP analysis. A CuCHA slurry was prepared by mixing 90 g of CuCHA, as described above, with 215 mL of deionized water. The mixture was ball-milled. 15.8 g of zirconium acetate in dilute acetic acid (containing 30% $ZrO_2$) was added into the slurry with agitation.

The slurry was coated onto 1"D×3"L cellular ceramic cores, having a cell density of 400 cpsi (cells per square inch) and a wall thickness of 6.5 mil. The coated cores were dried at 110° C. for 3 hours and calcined at 400° C. for 1 hour. The coating process was repeated once to obtain a target washcoat loading of 2.4 g/in$^3$.

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. The reaction was carried at a space velocity of 80,000 hr$^{-1}$ across a 150° C. to 460° C. temperature range.

Hydrothermal stability of the catalyst was measured by hydrothermal aging of the catalyst core in the presence of 10% $H_2O$ at 800° C. for 50 hours, followed by measurement of the nitrogen oxides SCR efficiency and selectivity by the same process as outlined above for the SCR evaluation on a fresh catalyst core.

FIG. 1 is graph showing the NOx conversion and $N_2O$ make or formation versus temperature for this sample. These results are summarized in Table 1. This sample, which did not contain soluble copper prior to calcination as indicated by the color of the filtrate described above, did not show enhanced resistance to thermal aging.

EXAMPLE 1A

Figure 1A:
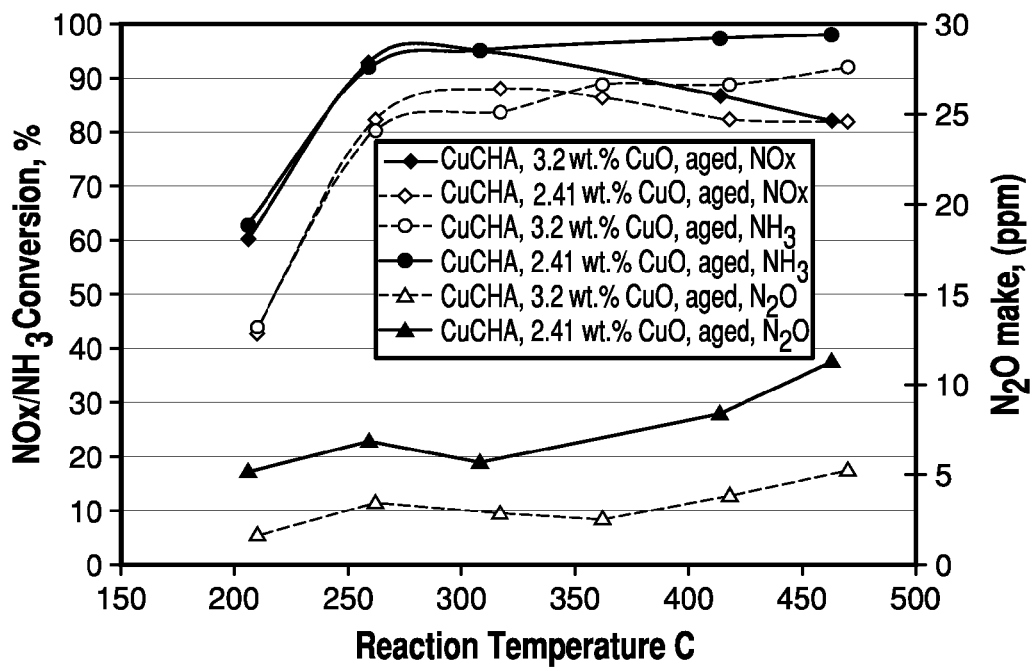
FIG. 1A is a graph depicting nitrogen oxides removal efficiency (%), ammonia consumption (%) and $N_2O$ generated (ppm) of CuCHA catalyst as a function of reaction temperatures for CuCHA prepared according to the methods of Examples 1 and 1A.
Figure 2:
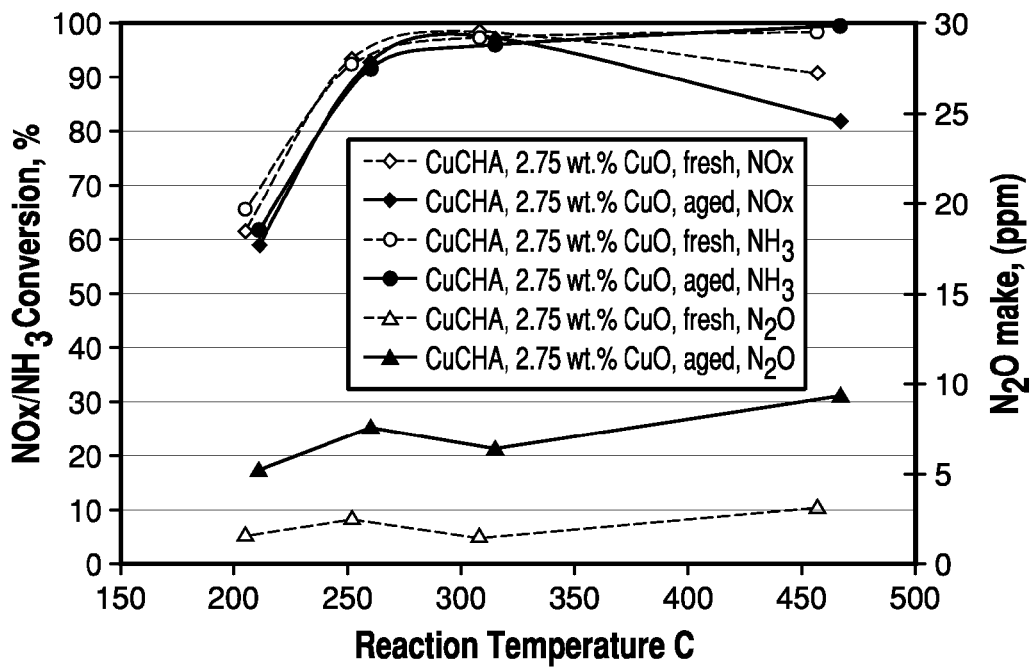
FIG. 2 is a graph depicting nitrogen oxides removal efficiency (%), ammonia consumption (%) and $N_2O$ generated (ppm) of CuCHA catalyst as a function of reaction temperatures, for CuCHA prepared according to the methods of Example 2.

To the coating slurry of Example 1 was added copper sulphate pentahydrate to bring up the total CuO level to 3.2%. The slurry was coated onto monolith and aged and tested for SCR NO$_x$ as outlined above for Example 1, except that the monolith was calcined at 640° C. The catalytic performance was compared with Example 1 in FIG. 1A. The addition of copper sulphate into the coating slurry significantly improved the hydrothermal stability and low temperature activity.

EXAMPLE 2

A CuCHA powder catalyst was prepared by mixing 17 Kg of $NH_4^+$-form CHA, having a silica/alumina mole ratio of 30, with 68 L of a copper(II) sulfate solution of 1.0 M. The pH was adjusted to 3.5 with nitric acid. An ion-exchange reaction between the $NH_4^+$-form CHA and the copper ions was carried out by agitating the slurry at 80° C. for 1 hour. The resulting mixture was then filtered and air-dried. The above process including the ion-exchange and filtering was repeated once. Then the wet filter cake was reslurried into 40 L deionized water followed by filtering and drying at 90° C. The resulting CuCHA product was then calcined at 640° C. in air for 6 hours. The obtained CuCHA catalyst comprised CuO at 2.75% by weight.

The slurry preparation, coating and SCR NO$_x$ evaluation were the same as outlined above for Example 1. This example contained free copper, and exhibited improved hydrothermal stability compared with Example 1.

EXAMPLE 3

CuCHA catalyst comprising 3.36% CuO by weight was prepared by the same process as that in Example 2 followed by an incipient wetness impregnation.

Using the procedure in Example 2, 134 grams of CuCHA at 3.11% CuO by weight was prepared. To this material, was added a copper sulfate solution comprised of 1.64 g of copper sulfate pentahydrate and 105 mL of deionized water. The impregnated sample was dried at 90° C. and calcined at 640° C. for 6 hours.

Figure 3:
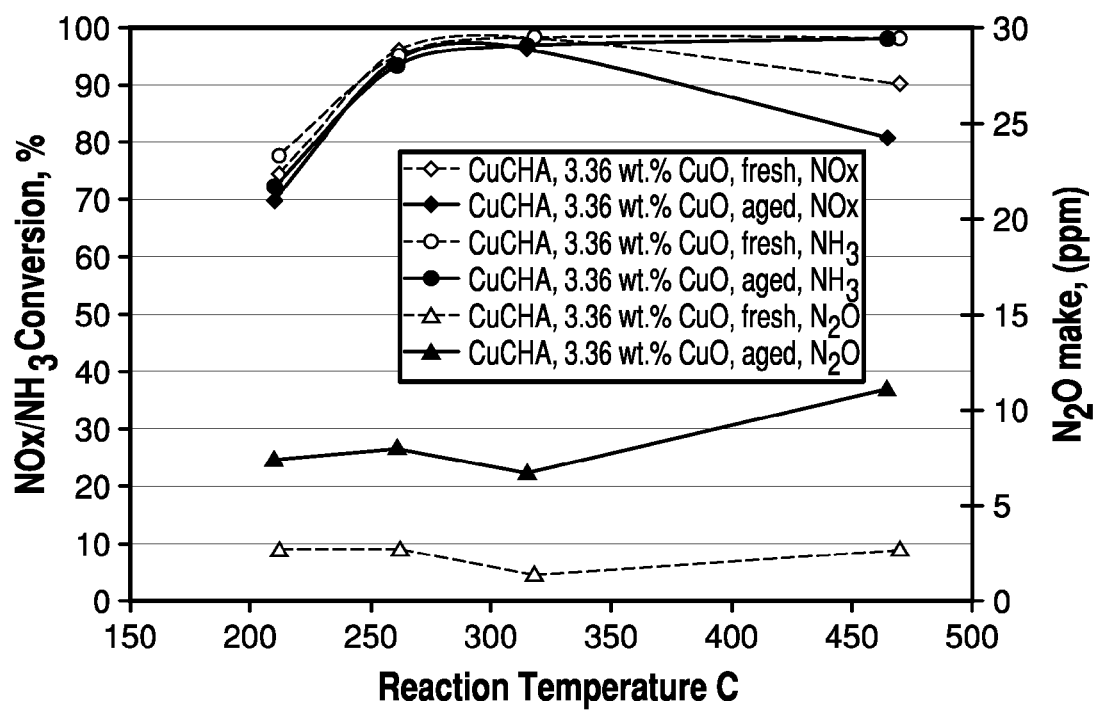
FIG. 3 is a graph depicting nitrogen oxides removal efficiency (%), ammonia consumption (%) and $N_2O$ generated (ppm) of CuCHA catalyst as a function of reaction temperatures for CuCHA prepared according to the methods of Example 3.

The slurry preparation, coating and SCR NO$_x$ evaluation are the same as outlined above for Example 1. As shown in FIG. 3, the sample containing more non-exchanged copper exhibited higher low temperature activity in addition to hydrothermal stability.

EXAMPLE 4

CuCHA catalyst comprising 3.85% CuO by weight was prepared by an incipient wetness impregnation process only. A copper sulfate solution comprised of 18.3 g of copper sulfate pentahydrate and 168 mL of deionized water was impregnated onto 140 g of $NH_4^+$-form CHA, having a silica/alumina mole ratio of 30. The impregnated sample was then dried at 90° C. and calcined at 640° C. for 6 hours.

Figure 4:
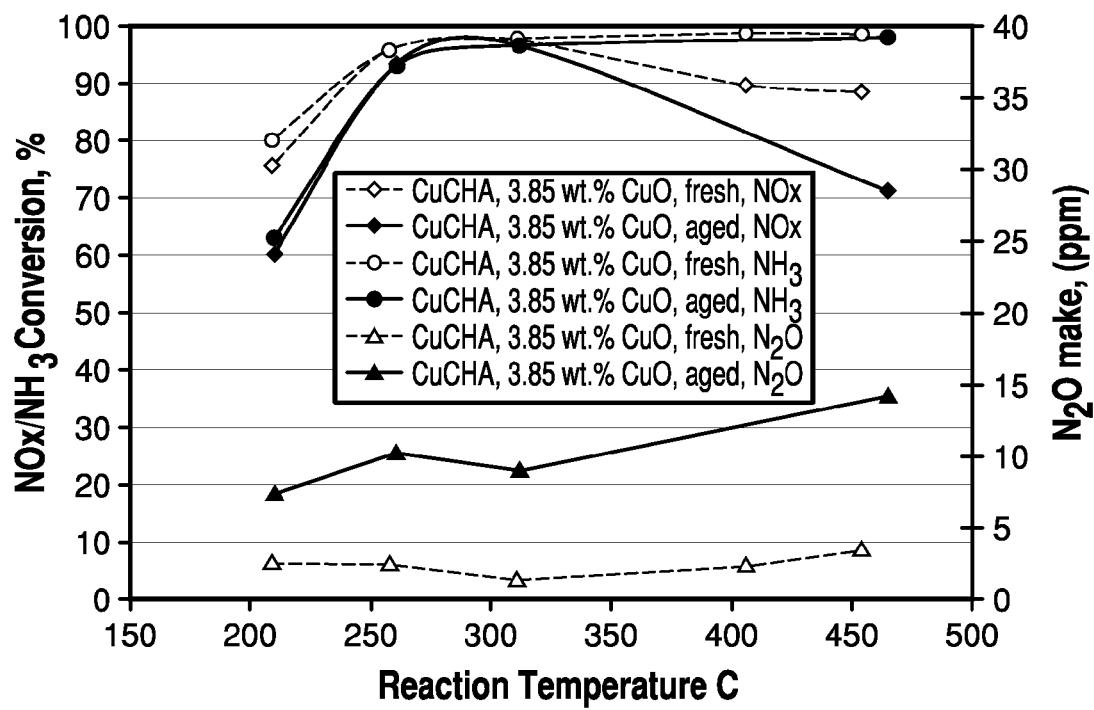
FIG. 4 is a graph depicting nitrogen oxides removal efficiency (%), ammonia consumption (%) and $N_2O$ generated (ppm) of CuCHA catalyst as a function of reaction temperatures for CuCHA prepared according to the methods of Example 4.

The slurry preparation, coating and SCR NO$_x$ evaluation are the same as outlined above for Example 1. As shown in FIG. 4, Example 4 exhibited a decline in performance between 350° C. and 450° C. after hydrothermal aging.

EXAMPLE 5

CuCHA catalyst comprising 1.94% CuO by weight was prepared by the same process as that in Example 1, except that this sample was prepared by a single ion-exchange.

The slurry preparation, coating and SCR NOx evaluation are the same as outlined above for Example 1, except that the hydrothermal stability was not measured.

EXAMPLE 6

A CuCHA powder catalyst was prepared by mixing 0.2 g of $NH_4^+$-form CHA, having a silica/alumina mole ratio of 15, with 16 mL of a copper(II) sulfate solution of 25 mM. An ion-exchange reaction between the $NH_4^+$-form CHA and the copper ions was carried out by agitating the slurry at 80° C. for 1 hour. The resulting mixture was then filtered, washed with deionized water and dried at 90° C. The above process including the ion-exchange, filtering, washing and drying was repeated once. The resulting CuCHA product was then calcined at 540° C. in air for 16 hours. The obtained CuCHA catalyst comprised CuO at 4.57% by weight.

The catalyst powder was hydrothermally aged in the presence of 10% $H_2O$ at 800° C. for 50 hours, followed by measurement of the nitrogen oxides SCR efficiency.

Catalyst performance was evaluated using a microchannel catalytic reactor containing a bed of approximately 12.6 mm$^3$ of catalyst. The flow rate (standard temperature and pressure) of 500 cc/min of reactants, consisting of 500 ppm NO$_x$, 500 ppm $NH_3$, 10% $O_2$, 5% $H_2O$, balanced with He, plus 25 cc/min steam was passed over the bed at various temperatures (200, 250, 300, 350, 400, 450 and 500° C.) to determine the reactivity of the catalyst. Conversion of NO$_x$ was determined by 100*(NO$_x$ fed−NO$_x$ out)/(NO$_x$ fed) using a mass spectral analyzer.

EXAMPLE 7

CuCHA powder catalyst comprising 2.94% CuO by weight was prepared by the same process as that in Example 6, including ion-exchange, filtering, washing, drying, calcinations and hydrothermal aging, except that the silica/alumina mole ratio was 30 and that the ion-exchange process was repeated 4 times.

The SCR NO$_x$ evaluation is the same as outlined above for Example 6.

EXAMPLE 8

CuCHA powder catalyst comprising 0.45% CuO by weight was prepared by the same process as that in Example 6, including ion-exchange, filtering, washing, drying, calcinations and hydrothermal aging, except that the silica/alumina mole ratio was 50.

The SCR NO$_x$ evaluation is the same as outlined above for Example 6.

EXAMPLE 9

A CuCHA powder catalyst was prepared by mixing 15.0 g of NH$_4$$^+$-form CHA, having a silica/alumina mole ratio of 256, with 61 mL of a copper(II) sulfate solution of 0.64 M. An ion-exchange reaction between the NH$_4$$^+$-form CHA and the copper ions was carried out by agitating the slurry at 80° C. for 1 hour. The resulting mixture was then filtered, washed with deionized water and dried at 90° C. The above process including the ion-exchange, filtering, washing and drying was repeated 4 times. The resulting CuCHA product was then calcined at 540° C. in air for 16 hours. The obtained CuCHA catalyst comprised CuO at 2.63% by weight.

The hydrothermal aging and SCR NO$_x$ evaluation was the same as outlined above for Example 6.

COMPARATIVE EXAMPLE 10

A Cu/Y zeolite powder catalyst was prepared having silica/alumina mole ratio of as described further below.

A Cu/Y powder catalyst was prepared by mixing 500 g of NH$_4$$^+$-form Zeolite Y, having a silica/alumina mole ratio of ~5, with 2500 mL of a copper(II) sulfate solution of 0.1 M. The pH was between 2.9 and 3.3. An ion-exchange reaction between the NH$_4$$^+$-form Y zeolite and the copper ions was carried out by agitating the slurry at 80° C. for 1 hour. The resulting mixture was then filtered, washed with deionized water and dried at 90° C. The above process including the ion-exchange, filtering, washing and drying was repeated for a total of 5 exchanges where pH was similar to above. The resulting Cu Zeolite Y product was then calcined at 640° C. in air for 16 hours. The obtained Cu Zeolite Y catalyst comprised CuO at 4.60% by weight.

The Cu/Y slurry was prepared by mixing 200 g of Cu/Y, as described above, with 400 mL of deionized water. The mixture was milled by passing twice through an Eigermill to obtain a slurry which comprised 90% particles smaller than 8 µm. 8.7 g of zirconium acetate in dilute acetic acid (containing 30% ZrO$_2$) was added into the slurry with agitation.

The slurry was coated onto 1"D×3"L cellular ceramic cores, having a cell density of 400 cpsi (cells per square inch) and a wall thickness of 6.5 mil. Two coats were required to obtain a target washcoat loading of 1.6 g/in$^3$. The coated cores were dried at 90° C. for 3 hours, and the cores were calcined at 450° C. for 1 hour after the second drying step.

The hydrothermal aging and SCR evaluation are the same as outlined in Example 1, except aging at was performed 750° C. for 25 hours.

COMPARATIVE EXAMPLE 11

A Cu/Beta powder catalyst was prepared having silica/alumina mole ratio is 35 using a procedure similar to the sample prepared in EXAMPLE 10. The hydrothermal aging and SCR evaluation are the same as outlined in Example 1.

A summary of the data for Examples 1-5 and Comparative Examples 10-11 is contained in Table 1 below.

TABLE 1

| Example | Cu/Al Atomic ratio | CuO % | NO$_x$ conversion (%) | | | | N$_2$O make, ppm | |
|---|---|---|---|---|---|---|---|---|
| | | | 210° C., fresh | 210° C., aged | 460° C., fresh | 460° C., aged | 460° C., fresh | 460° C., aged |
| 1 | 0.30 | 2.41 | 75 | 43 | 95 | 82 | 0.8 | 5.3 |
| 2 | 0.33 | 2.75 | 62 | 59 | 90 | 83 | 3.1 | 9.3 |
| 3 | 0.38 | 3.36 | 74 | 70 | 91 | 81 | 2.7 | 10.5 |
| 4 | 0.44 | 3.85 | 76 | 60 | 88 | 72 | 3.5 | 14.2 |
| 5 | 0.24 | 1.94 | 50 | 30 | 95 | 75 | 0.2 | 5.0 |
| 10 | 0.23 | 4.6 | 43 | 42 | 99 | 96 | 26 | 51 |
| 11 | 0.36 | 2.5 | 92 | 23 | 84 | 53 | 10 | 9.4 |
| 12 | 0.46 | 3.7 | 75 | 78 | 89 | 80 | 5.4 | 11.7 |
| 1A | 0.40 | 3.2 | | 61 | | 82 | | 11.3 |

Table 1 indicates that Example 3 exhibited the best combination of low temperature activity, high temperature activity and showed little degradation due to hydrothermal aging.

Table 2 shows the normalized NOx conversion for Examples 6-9, which contained varying SiO$_2$/Al$_2$O$_3$ Mole ratios and Cu/Al Atomic ratios. Example 7 exhibited the best performance. While the performance of Examples 6, 8 and 9 was not optimal, it is to be noted that each of the Examples was aged at a rather high temperature of 800° C. Not all catalysts will experience such high temperatures, and it is believed that samples aged at lower temperatures would exhibit acceptable performance at a wider acceptable silica/alumina ratio. For example, in an exhaust gas treatment system having an SCR catalyst downstream of a catalyzed soot filter, the SCR would typically be exposed to high temperatures, e.g., exceeding about 700° C. If the SCR is disposed on the CSF, the SCR may experience temperatures as high as about 800° C., or higher. According to embodiments of the present invention, greater flexibility in locating a catalyst such as an SCR catalyst in an exhaust gas treatment system is provided due to the CuCHA catalysts which exhibit improved hydrothermal stability compared with other types of zeolite materials. Samples having a range of silica to alumina ratio between about 15 and 256 which experience operational temperatures below about 800° C. would be expected to exhibit acceptable low temperature NOx conversion. Thus, according to embodiments of the invention, silica to alumina ratios of about 15 to about 256 are within the scope of the invention, however, narrower ranges having a lower range endpoint of about 10, 20, about 25 and about 30 and a higher range endpoint of 150, 100, 75, 50 and 40 are within the scope of the invention.

TABLE 2

| Example | SiO$_2$/Al$_2$O$_3$ Mole ratio | CuO % | Cu/Al Atomic ratio | NO$_x$ conversion, aged, normalized | | |
|---|---|---|---|---|---|---|
| | | | | 200° C. | 250° C. | 300° C. |
| 6 | 15 | 4.57 | 0.30 | 0.34 | 0.61 | 0.81 |
| 7 | 30 | 2.94 | 0.36 | 1.00 | 1.00 | 0.98 |
| 8 | 50 | 0.45 | 0.089 | 0.39 | 0.54 | 1.00 |
| 9 | 256 | 2.63 | 2.6 | 0.10 | 0.70 | 0.88 |

EXAMPLE 12

Cucha Inhibition Study

The samples tested in this Example were prepared as follows. A CuCHA powder catalyst was prepared by mixing 250 g of NH$_4^+$-form CHA, having a silica/alumina mole ratio of 30, with 2.0 L of a copper(II) sulphate solution of 0.1 M. The pH was adjusted to 3.0 to 3.4 with nitric acid. An ion-exchange reaction between the NH$_4^+$-form CHA and the copper ions was carried out by agitating the slurry at 80° C. for 1 hour. The resulting mixture was then filtered, washed with deionized water and dried at 90° C. The above process including the ion-exchange, filtering, washing and drying was repeated for a total of 5 times. The resulting CuCHA product was then calcined at 640° C. in air for 16 hours. The obtained CuCHA catalyst comprised CuO at 3.68% by weight.

The impact of CO, propene, n-octane and water on the CuCHA SCR activity at temperatures 170, 200, 250, 300 and 350° C. was investigated. The catalyst cores were tested in a simulated diesel exhaust mixture. The main gas concentrations were as follows: 500 ppm NO, 500 ppm NH$_3$, 10% CO$_2$, 10% O$_2$. The following components were added sequentially to investigate the effect on the NOx conversion: 5% H$_2$O, 300 ppm C$_3$H$_6$ as C1, 600 ppm C$_3$H$_6$ as C1, 100 ppm Octane as C1 and 500 ppm CO. The space velocity of the experiments was set to 142,000 h$^{-1}$. The reaction was allowed to reach steady state at temperature points of 170° C., 200° C., 250° C., 300° C. and 350° C. and the subsequent conversions and component interactions were recorded. Gas analysis of NO, NO$_2$, N$_2$O, NH$_3$, CO$_2$, CO, C$_3$H$_6$ and H$_2$O was performed using an MKS 2030 MultiGas FTIR running at 0.5 cm$^{-1}$ resolution.

Figure 5:
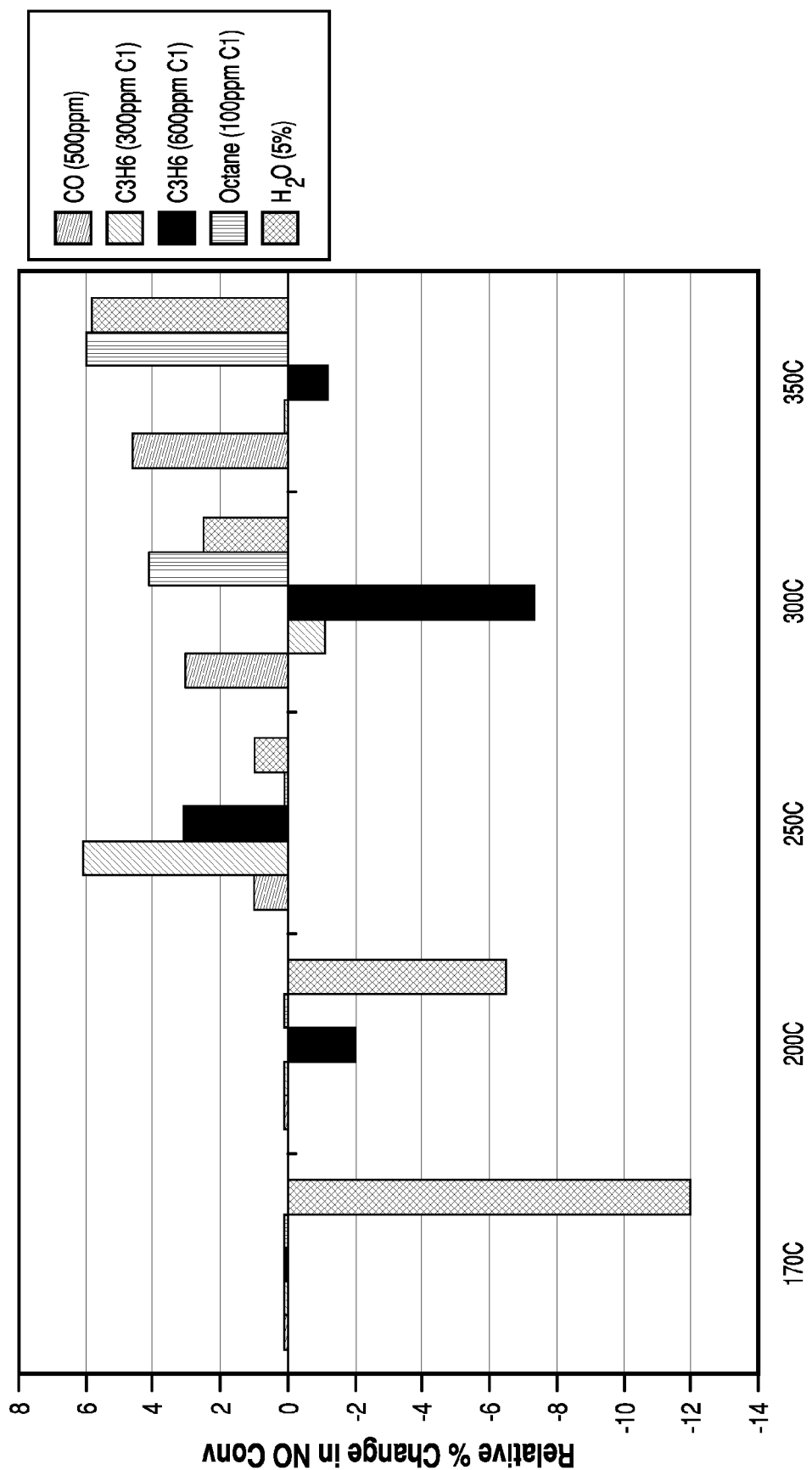
FIG. 5 is a graph depicting effects of CO, propene, n-octane and water on the CuCHA SCR activity at various temperatures.

The results are summarized in FIG. 5. At low temperatures 170° C. and 200° C. water was the main inhibitor, high level of propen at 200 ppm (600 ppm C1) was slightly inhibiting at 200 C, 100 ppm propene (300 ppm C1), CO, and n-octane had no impact. At temperatures higher than 250° C., water was observed to be a promoter. None of the components tested were inhibiting the NOx conversion at 250° C., on the contrary they were all promoters. At 300° C., CO and n-octane promoted the SCR NOx, whereas 600 ppm C1 propene inhibited the reaction. At 350° C., only 600 ppm C1 propene had minor inhibition, and the other components all had positive effect. This performance is believed to be better than the performance of other Cu-promoted SCR catalysts that use medium and large pore zeolites, for example, beta zeolites. SCR catalysts are known to be susceptible to transient poisoning by long chain hydrocarbons, which can fill the pores with coke. These tests show that the small pore CuCHA zeolite did not exhibit this problem.

EXAMPLE 12A

HC Storage/Release Test

Gases and Apparatus:

A catalyst core of CuCHA coated on a ceramic monolith (400 cpsi/6 mil) presenting a cross section of 144 open cells and 1" length was first aged for 50 h at 800 C in 10% H$_2$O, 10% O2, balance nitrogen. Subsequently, the catalyst was placed in a laboratory reactor. The catalyst was exposed to a gas mixture comprising 4% H$_2$O, 14% O$_2$, 100 ppm NO, balance N$_2$ and heated to 100° C. After temperature stabilization at 100° C., a blend of toluene and octane was added via mass flow controller so as to achieve a target concentration of 100 ppm C1 as octane and 100 ppm C1 as toluene at a total space velocity of 104 kh$^{-1}$. The effluent gas was led over an afterburner which was comprised of a Pt/alumina based oxidation catalyst and kept at a constant temperature of 600° C. Any hydrocarbon emissions including partial oxidation products and CO that might be formed over the CuCHA catalyst will be oxidized into CO$_2$ when passed over the afterburner. The CO$_2$ effluent from the afterburner is monitored by an IR CO$_2$ analyzer. In parallel, a slip stream of the effluent from the CuCHA catalyst bypassing the afterburner has been analyzed by a FID-HC analyzer.

Test Protocol:

After the stabilization of the CuCHA catalyst at 100° C. in a mixture of 4% H$_2$O, 14% O$_2$, 100 ppm NO, balance N$_2$, the hydrocarbon blend of octane and toluene was introduced. During 10 min the catalyst temperature was kept at 100° C. During this period, HCs are stored over the catalyst which leads to a CO$_2$ afterburner out signal below the HC inlet concentration. After the storage period, the temperature is raised linearly from 100° C. to 600° C. at a ramp of 20° C./min. The CO$_2$ afterburner signal increases sharply which is due to a release of stored of HCs from the catalyst. Upon completion of the desorption, the CO$_2$ signal returns to the baseline value (=feed gas concentration). As the temperature rises, a small decrease of the afterburner out CO$_2$ below the feed gas level indicates a second type of HC removal which is due to the deposition of carbonaceous deposits formed from toluene and octane over the catalyst. As the temperature increases further any carbonaceous deposits formed will burn off and cause an elevated CO$_2$ afterburner out signal. After the burn off of carbonaceous deposits is completed, the CO$_2$ afterburner signal will eventually return to its baseline value.

Figure 5A:
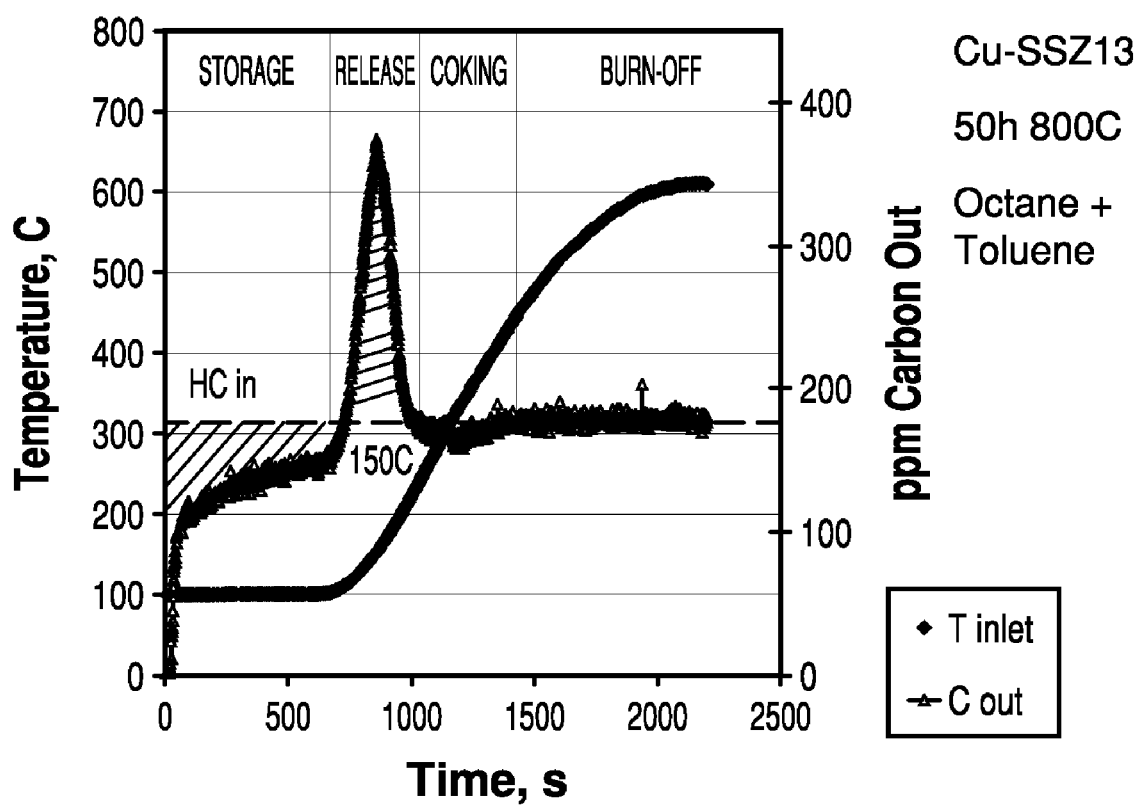
FIG. 5A is a graph showing the amount of HCs that are stored, released, deposited as coke and burnt-off coke for a sample tested in accordance with Example 12A.

Data Analysis:

The CO$_2$ afterburner signal was evaluated quantitatively in order to determine the amount of HCs that are stored, released, deposited as coke and burnt-off coke. The corresponding intersections of the afterburner out CO$_2$ trace shown in FIG. 5A with the HC feed gas concentration were used as integration limits. For the example of CuCHA these integration limits were approximately between 0 and 800 s for the storage, between 800 s and 1000 s for the release, between 1000 s and 1400 s for the coking, respectively. The amount of HCs that were stored, released, deposited as coke and subsequently burnt-off are expressed as mg HC based on the average C:H ratio of the feed stream HCs.

Figure 5B:
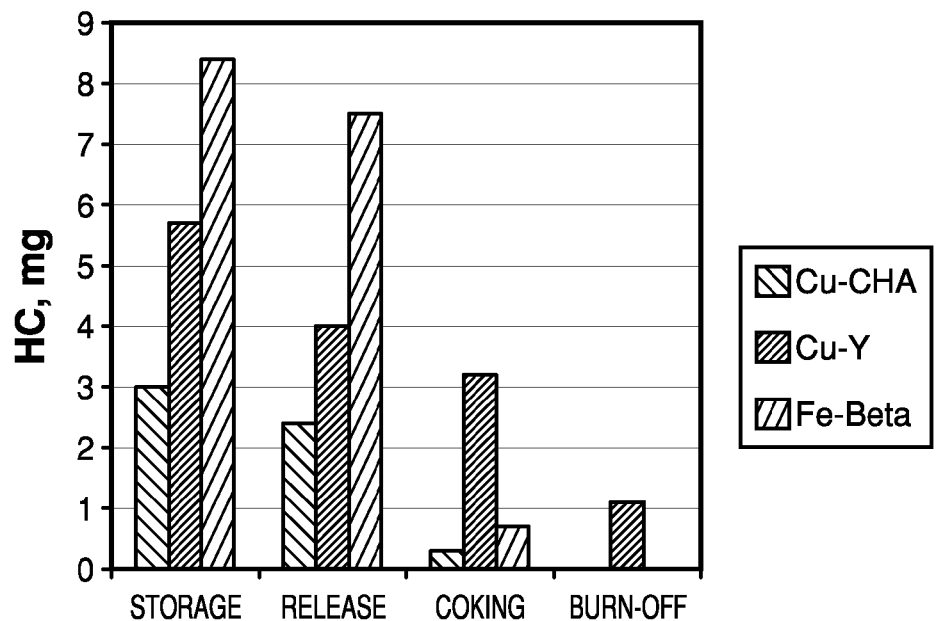
FIG. 5B is a bar chart showing hydrocarbon performance of CuCHA compared with CuY and Fe beta zeolites in accordance with Example 12A.

Results:

This experiment was carried out with Cu—Y (after aging for 25 h (750 C in 10% H$_2$O, 10% O$_2$, balance N$_2$) and Fe-Beta (after aging for 50 h at 800° C. in 10% H$_2$O, 10% O$_2$, balance N$_2$) SCR catalysts of the same volume under the same conditions. In the case of CuCHA, there appears to be very little coking and consequently there is no noticeable burn-off signal. The results are graphed in FIG. 5B. It is evident that the CuCHA catalyst stores the least amount of HCs of which most is released as HCs and little is deposited as coke. The Cu—Y catalyst on the contrary did form a substantial amount of carbonaceous deposits in the temperatures range from about 200° C. to 450° C. Part of the built up coke is subsequently burnt-off at higher temperatures.

EXAMPLE 13

Preparation of AMOX Catalyst

An ammonia oxidation catalyst comprising a CuCHA was prepared as in Example 12 and having a copper content of 3.68% measured as CuO, and $SiO_2/Al_2O_3$ ratio of 30. This material was coated onto a standard monolithic cordierite support, having a square-cell geometry of 400 cells/in$^3$, to provide a total loading of 2.40 g/in$^3$ based on monolith bulk volume. This pre-coated monolith was then dipped into a solution of a platinum-containing precursor (a platinum hydroxy amine complex) to fully and uniformly distribute the platinum precursor on the part. The part was dried at 110° C. and then calcined at 450° C. for one hour. This provided a platinum loading on the part of 4.3 g/ft$^3$ based on monolith bulk volume. Thus the catalyst had the following composition: 3.68% CuO+0.10% Pt supported on CuCHA, coated on standard cordierite 400/6 support at total part loading of about 2.4 g/in$^3$. The Al:Cu:Pt atomic ratio in the present catalyst is about 190:90:1. The Al/M ratio (M=Cu+Pt) is equal to about 2.1.

EXAMPLE 14

Testing of Samples of Example 13

Figure 6:
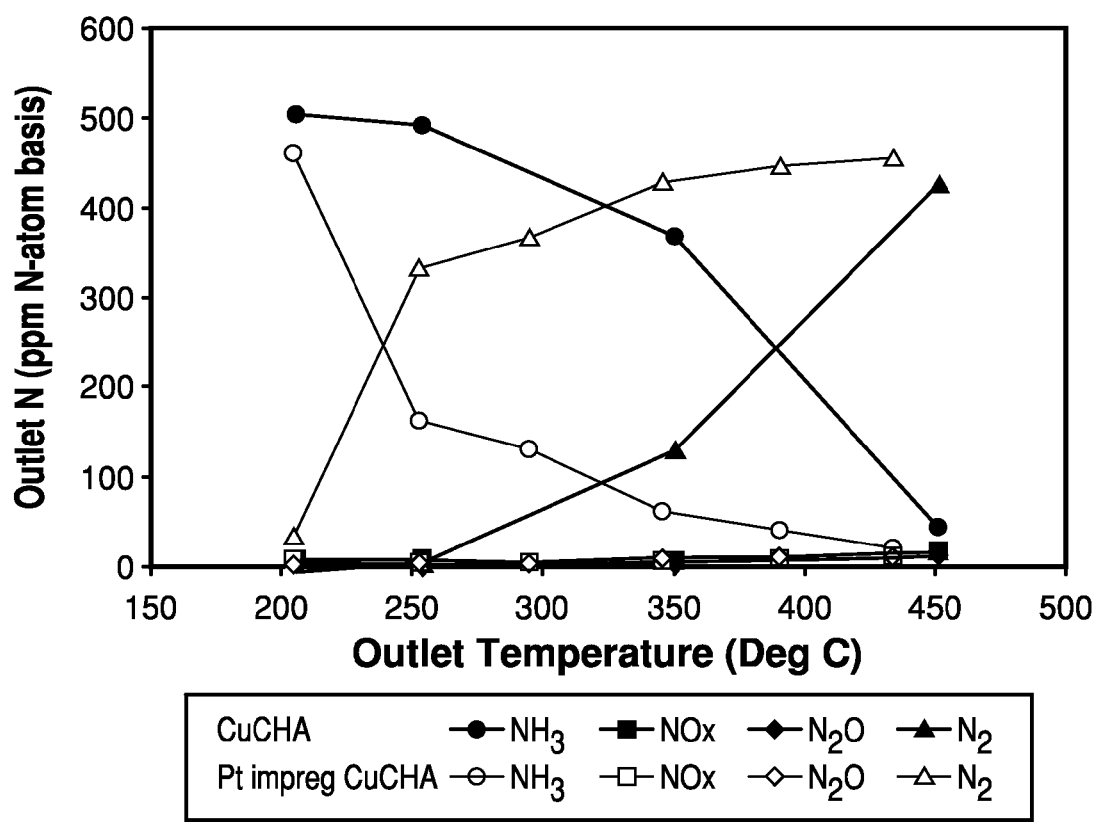
FIG. 6 is a graph depicting emissions of $NH_3$, NOx (=NO+NO$_2$), $N_2O$, and $N_2$ from the AMOX catalyst outlet, given as ppm on a nitrogen atom basis prepared and aged according to the method of Examples 13 and 14.

Ammonia removal efficiency and oxidation product selectivities of hydrothermally-aged AMOx catalyst cores prepared as described in Example 13 were measured by adding a feed gas mixture of 500 ppm of $NH_3$, 10% $O_2$, 5% $H_2O$, balanced with $N_2$ (as air) to a steady state reactor containing a 3.0 inch long square-cylindrical catalyst core with a facial cross section containing 144 open cells. The reaction was carried out at a space velocity of 100,000 hr$^{-1}$ across a 150° C. to 460° C. temperature range. Hydrothermal aging conditions are 10 hours at 700° C. with 10% $H_2O$ in air. FIG. 6 is a graph showing emissions compared with those from a hydrothermally-aged sample of CuCHA. The data show 1) the highly selective $NH_3$ conversion to $N_2$ catalyzed by the CuCHA catalyst in the absence of Pt impregnation, and 2) that the $NH_3$ conversion can be dramatically enhanced by inclusion of the platinum component without compromising the high $N_2$ selectivity. The latter is significant in that the prior art shows that platinum as a metallic gauze or supported on other oxides or zeolitic supports is generally selective for production of $N_2O$ or $NO_x$.

EXAMPLE 15

Comparison of the CuCHA formulation on a flow through substrate and a wall flow filter at comparable loadings. A wall flow filter was coated with the same catalyst as the flow through catalyst carrier of Example 3 and the two samples measure to compare their catalytic activity.

A CuCHA slurry was prepared by mixing 90 g of CuCHA, as described above, with 215 mL of deionized water. The mixture was ball-milled for 11 hours to obtain a slurry which comprised 90% particles smaller than 10 µm. 15.8 g of zirconium acetate in dilute acetic acid (containing 30% $ZrO_2$) was added into the slurry with agitation.

The slurry was coated onto 1"D×6"L cellular ceramic wall flow filter cores, having a cell density of 300 cpsi (cells per square inch) and a wall thickness of 12 mil. The coated cores were dried at 120° C. for 3 hours and calcined at 540° C. for 1 hour. The coating process was repeated once to obtain a target washcoat loading of 2.0 g/in$^3$.

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×6"L catalyst core. The reaction was carried at a space velocity of 40,000 hr$^{-1}$ across a 150° C. to 400° C. temperature range.

Hydrothermal stability of the catalyst was measured by hydrothermal aging of the catalyst core in the presence of 10% $H_2O$ at 750° C. for 25 hours, followed by measurement of the nitrogen oxides SCR efficiency and selectivity by the same process as outlined above for the SCR evaluation on a fresh catalyst core.

Table 3 below shows the comparison of the hydrothermally aged SCR performance of the CuCHA coated on a filter versus the CuCHA coated on a flow through catalyst carrier.

TABLE 3

| SCR performance comparison (% conversion) of filter and flow through substrates |||||| |
| --- | --- | --- | --- | --- | --- |
| NO | $NO_2$ | NO$x$ | $NH_3$ | $N_2O$ make (ppm) | Sample Temp (degrees C.) |
| CuCHA on Flow through, aged 50 H @ 800 C. w/ 10% water |||||| |
| 74.6 | 83.5 | 75.0 | 76.9 | 8.4 | 211 |
| 96.3 | 95.6 | 96.2 | 93.9 | 9.2 | 255 |
| 97.6 | 97.5 | 97.6 | 97.3 | 7.6 | 309 |
| 82.7 | 36.5 | 81.0 | 98.1 | 12.3 | 441 |
| CuCHA on filter, aged 25 H @ 750 C. w/ 10% water |||||| |
| 74.7 | 81.5 | 75.1 | 76.0 | 8.8 | 207 |
| 96.4 | 96.1 | 96.4 | 96.5 | 9.9 | 255 |
| 98.6 | 97.7 | 98.5 | 96.8 | 8.7 | 304 |
| 96.2 | 90.7 | 95.9 | 98.7 | 8.2 | 352 |
| 91.1 | 62.4 | 89.8 | 99.4 | 11.7 | 400 |

In spite of some differences in exact experimental detail, the comparison clearly supports the equivalence of the catalytic performance of CuCHA on the filter core and the flow through monolith catalyst.

EXAMPLE 16

An $NH_4^+$-CHA slurry was prepared by mixing 608 g of $NH_4^+$-CHA, having a silica/alumina mole ratio of 30, with 796 mL of deionized water. The mixture was milled using a Netzsch Mill to obtain a slurry which comprised 90% particles smaller than 8.4 µm. 106 g of zirconium acetate in dilute acetic acid (containing 30% $ZrO_2$) was added into the slurry with agitation.

The slurry was coated onto 1"D×3"L cellular ceramic cores, having a cell density of 400 cpsi and a wall thickness of 6.5 mil. The coated cores were dried at 110° C. for 3 hours. The coating process was repeated once to obtain a target washcoat loading of 2.4 g/in$^3$.

This pre-coated monolith was then dipped into a 0.25M solution of copper acetate for 5 minutes at room temperature. The core was gently blown with an air gun and dried at 110°

C. for 3 hours and then calcined at 400° C. for 1 hour. This provided a CuO loading on CHA of 2.72 wt. % based on the CHA weight on monolith.

The SCR NOx evaluation of the fresh catalyst was the same as outlined for Example 1. Hydrothermal stability of the catalyst was measured by hydrothermal aging of the catalyst core in the presence of 10% steam at 850° C. for 6 hrs, followed by measurement of the SCR NOx efficiency as outlined for the fresh catalyst.

Figure 7:
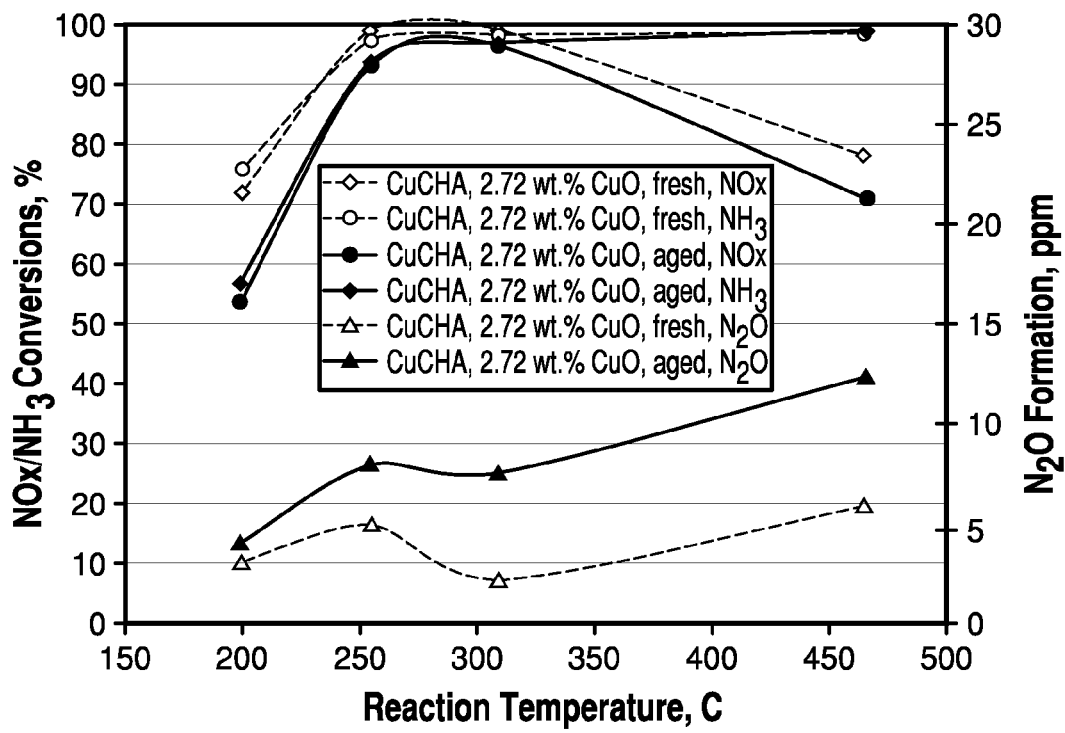
FIG. 7 is a graph depicting nitrogen oxides removal efficiency (%), ammonia consumption (%) and $N_2O$ generated (ppm) of CuCHA catalyst as a function of reaction temperatures, for CuCHA prepared according to the methods of Example 16.

FIG. 7 is graph showing the NOx conversion and $N_2O$ formation versus temperature for this sample.

EXAMPLE 17

12.1 g of copper acetate monohydrate was dissolved in 420 g deionized water, then 141 g of $NH_4^+$-CHA, having a silica/alumina mole ratio of 30, was added in. The mixture was milled using a Netzsch Mill to obtain a slurry which comprised 90% particles smaller than 3.5 μm.

The slurry was coated onto 1"D×3"L cellular ceramic cores, having a cell density of 400 cpsi and a wall thickness of 6.5 mil. The coated cores were dried at 110° C. for 3 hours. The coating process was repeated twice to obtain a target washcoat loading of 2.4 g/in$^3$. The coated cores were then calcined at 400° C. for 1 hour. This provides a CuO loading on CHA of 3.3 wt. %.

The SCR NOx evaluation of the fresh catalyst was the same as outlined for Example 1. Hydrothermal stability of the catalyst was measured by hydrothermal aging of the catalyst core in the presence of 10% steam at 850° C. for 6 hrs, followed by measurement of the SCR NOx efficiency as outlined for the fresh catalyst.

Figure 8:
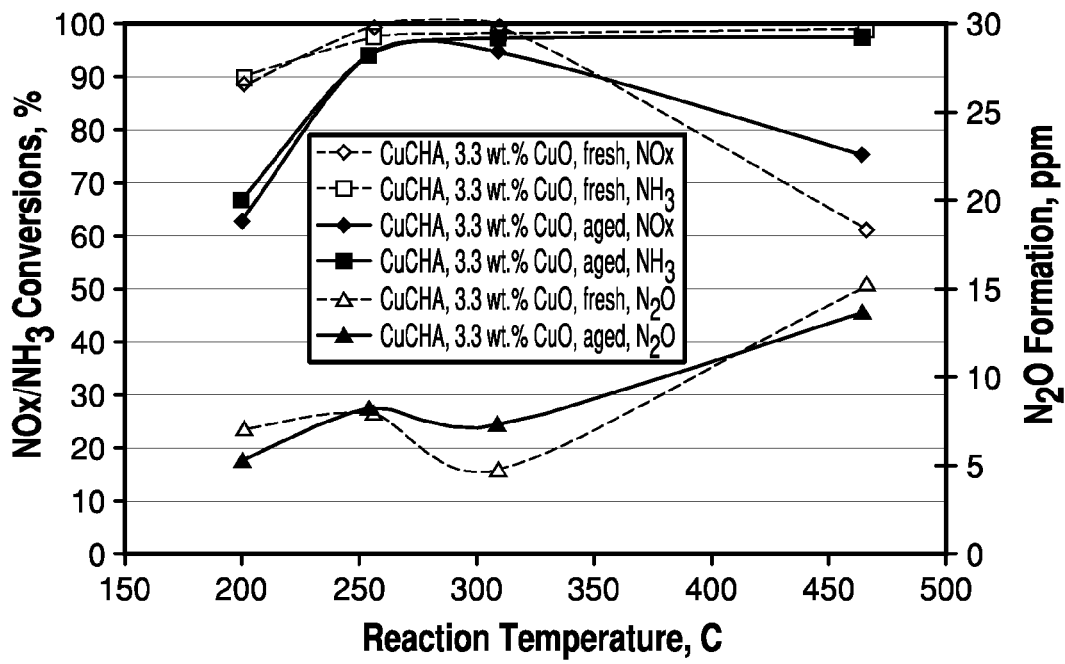
FIG. 8 is a graph depicting nitrogen oxides removal efficiency (%), ammonia consumption (%) and $N_2O$ generated (ppm) of CuCHA catalyst as a function of reaction temperatures, for CuCHA prepared according to the methods of Example 17.

FIG. 8 is graph showing the NOx conversion and $N_2O$ formation versus temperature for this sample.

EXAMPLE 18

A CuCHA powder catalyst was prepared by ion-exchange with copper acetate. A 0.40 M of copper (II) acetate monohydrate solution was prepared by dissolving 89.8 g of the copper salt in 1.125 L of deionized water at 70° C. 300 g of $NH_4^+$-form CHA was then added to this solution. An ion-exchange reaction between the NH4$^+$-form CHA and the copper ions was carried out by agitating the slurry at 70° C. for 1 hour. The pH was between 4.8 and 4.5 during the reaction. The resulting mixture was then filtered, washed until the filtrate had a conductivity of <200 μScm$^{-1}$, which indicated that substantially no soluble or free copper remained in the sample, and the washed sample was dried at 90° C. The obtained CuCHA catalyst comprised CuO at 3.06% by weight and $Na_2O$ at 140 ppm.

Figure 9:
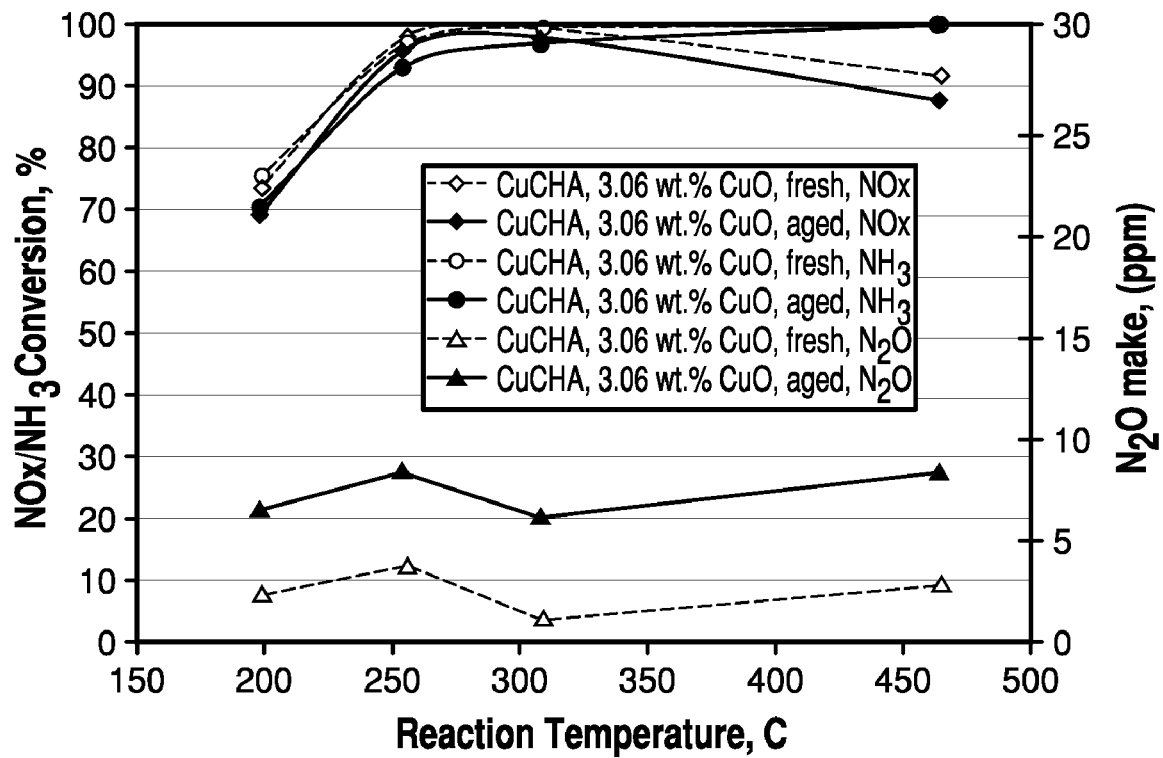
FIG. 9 is a graph depicting nitrogen oxides removal efficiency (%), ammonia consumption (%) and $N_2O$ generated (ppm) of CuCHA catalyst as a function of reaction temperatures for CuCHA prepared according to the methods of Example 18.

The slurry preparation, coating and SCR $NO_x$ evaluation were the same as outlined above for Example 1. As shown in FIG. 9, Example 18 exhibited the same SCR performance as Example 3 that was prepared by twice ion-exchanges with copper sulphate plus an incipient wetness impregnation.

EXAMPLE 19

CuCHA catalyst comprising 2.99% CuO by weight was prepared by the same process as that in Example 18, except that this sample was prepared in 0.30 M Cu solution.

EXAMPLE 20

CuCHA catalyst comprising 2.69% CuO by weight was prepared by the same process as that in Example 18, except that the ion-exchange was processed at 45° C.

EXAMPLE 21

CuCHA catalyst comprising 2.51% CuO by weight was prepared by the same process as that in Example 19, except that the ion-exchange was processed at 45° C.

The Cu loadings of Examples 18-21 are compared with that of Example 1 in Table 4. We see that copper acetate is more efficient than copper sulphate to provide desired Cu loading with a low concentration of copper solution at lower reaction temperature.

TABLE 4

| Example | Cu salt | $Cu^{2+}$ Conc., M | Reaction T, ° C. | CuO wt. % |
|---|---|---|---|---|
| 1 | Cu sulphate | 1.0 | 80 | 2.41 |
| 18 | Cu acetate | 0.40 | 70 | 3.06 |
| 19 | Cu acetate | 0.30 | 70 | 2.99 |
| 20 | Cu acetate | 0.40 | 45 | 2.69 |
| 21 | Cu acetate | 0.30 | 45 | 2.51 |

EXAMPLE 22

Hydrothermal Aging and Chemical Analysis of Example 2

The Cu/CHA powder prepared in Example 2 was hydrothermally aged in the presence of 10% $H_2O$ in air at 800° C. for 48 hours. The analyzed material from Example 2 is labeled Example 22 in FIGS. 11 and 12 and Tables 5 and 6. The hydrothermally aged sample is labeled Example 22A in Tables 5 and 6 and FIGS. 11 and 12.

The X-ray powder diffraction patterns were determined by standard techniques. Generator settings are 45 kV and 40 mA. The diffractometer optics consists of a variable divergence slit, incident beam soller slits, a receiving slit, a graphite monochromater, and a scintillation counter using Bragg-Brentano parafocusing geometry. The d-spacings were calculated from the lattice parameters of a=13.58 and c=14.76 Å for Example 22 and a=13.56 and c=14.75 Å for Example 22A. The lattice parameters were determined by scanning the sample with LaB6 mixed in as an internal standard. The data range was 15-38.5 degrees two theta using a step size of 0.01 and counting for 5 seconds. The resulting pattern was run through profile refinement in JADE software. The LaB6 lattice parameters were kept constant at 5.169 A to compensate for sample displacement errors. Table 5 shows the X-ray powder diffraction lines for Example 22 and Example 22A. The CHA crystalline structure retained after 800° C. 48 hours steam aging.

TABLE 5

| Example 22 | | | Example 22A | | |
|---|---|---|---|---|---|
| 2-Theta | d (Å) | I (%) | 2-Theta | d (Å) | I (%) |
| 9.63 | 9.201 | 100% | 9.62 | 9.189 | 100% |
| 13.02 | 6.793 | 37% | 13.04 | 6.782 | 36% |
| 14.15 | 6.252 | 8% | 14.17 | 6.247 | 7% |
| 16.21 | 5.465 | 28% | 16.23 | 5.457 | 26% |
| 18.01 | 4.921 | 32% | 18.03 | 4.917 | 30% |
| 19.28 | 4.600 | 3% | 19.30 | 4.595 | 3% |
| 20.85 | 4.258 | 89% | 20.88 | 4.251 | 82% |
| 22.29 | 3.985 | 4% | 22.31 | 3.981 | 4% |
| 22.65 | 3.922 | 5% | 22.69 | 3.916 | 4% |
| 23.33 | 3.809 | 8% | 23.37 | 3.804 | 7% |
| 25.27 | 3.521 | 41% | 25.29 | 3.519 | 38% |

TABLE 5-continued

| Example 22 | | | Example 22A | | |
|---|---|---|---|---|---|
| 2-Theta | d (Å) | I (%) | 2-Theta | d (Å) | I (%) |
| 26.22 | 3.397 | 24% | 26.26 | 3.391 | 23% |
| 27.98 | 3.186 | 5% | 28.03 | 3.181 | 5% |
| 28.53 | 3.126 | 6% | 28.56 | 3.123 | 5% |
| 29.91 | 2.985 | 3% | 29.96 | 2.980 | 3% |
| 30.98 | 2.885 | 57% | 31.03 | 2.880 | 53% |
| 31.21 | 2.864 | 17% | 31.23 | 2.862 | 17% |
| 31.48 | 2.840 | 28% | 31.51 | 2.837 | 26% |
| 31.99 | 2.795 | 4% | 32.04 | 2.792 | 4% |
| 32.75 | 2.733 | 3% | 32.80 | 2.728 | 3% |
| 33.73 | 2.655 | 2% | 33.78 | 2.651 | 2% |
| 33.95 | 2.639 | 4% | 33.98 | 2.637 | 4% |
| 34.92 | 2.568 | 13% | 34.98 | 2.563 | 12% |
| 35.38 | 2.535 | 3% | 35.43 | 2.531 | 2% |
| 36.50 | 2.460 | 9% | 36.54 | 2.457 | 8% |
| 38.72 | 2.324 | 2% | 38.78 | 2.320 | 1% |
| 38.90 | 2.313 | 1% | 38.93 | 2.312 | 1% |
| 39.13 | 2.300 | 2% | 39.18 | 2.297 | 2% |
| 39.56 | 2.276 | 1% | 39.62 | 2.273 | 1% |
| 39.78 | 2.264 | 2% | 39.84 | 2.261 | 2% |

Figure 11:
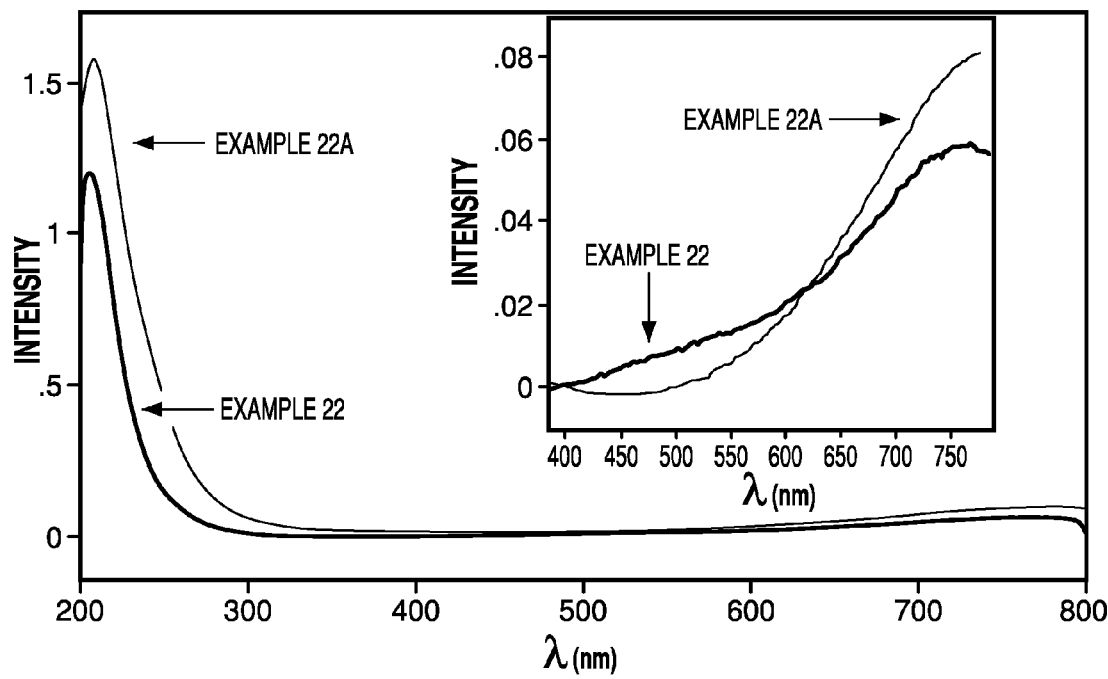
FIG. 11 is UV/VIS of Example 22 and 22A.

UV/VIS diffuse reflectance spectra expressed by F(R) were collected using a diffuse reflectance attachment with an integrating and reference sphere coated with $BaSO_4$ inside a Cary 300 UV-Vis spectrometer. The UV/VIS of Example 22 and 22A are shown in FIG. 11.

Table 6 lists the $^{29}Si$ MAS NMR (Magic Angle Spinning Nuclear Magnetic Resonance) data and the calculated framework Si/Al atomic ratio of Example 22 and 22A. The data for the CHA and the 800° C., 48 hours, 10% steam-aged CHA are also included for comparison. The data indicate that a degree of de-alumination takes place upon aging of both CHA and Cu/CHA samples. However, the Cu/CHA sample undergoes much less de-alumination upon aging. It is also observed that the Cu-exchange process itself slightly alters the framework Si/Al atomic ratio from 15 to 17.

Figure 12:
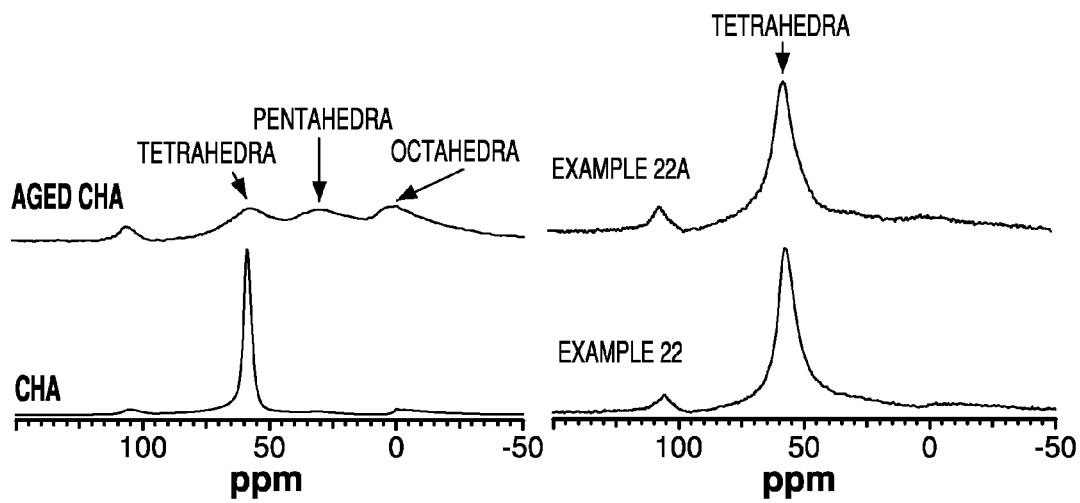
FIG. 12 is $^{27}Al$ MAS NMR spectra of Example 22 and 22A, compared with CHA and aged CHA samples.

FIG. 12 shows the $^{27}Al$ MAS NMR (Magic Angle Spinning Nuclear Magnetic Resonance) spectra of Example 22 and 22A, as well as the CHA and aged CHA samples. The spectra indicate that some of the tetrahedral Al species are converted to penta- and octa-coordinated species upon Cu-exchange. The spectra strongly support that the Cu/CHA sample undergoes much less de-alumination upon aging than the CHA sample.

TABLE 6

| | Intensity % | | | | |
|---|---|---|---|---|---|
| Sample | Si(0Al) −114 ppm | Si(0Al) −111 ppm | Si(1Al) −105 ppm | Si(1Al) −101 ppm | Si/Al |
| CHA | 2 | 71 | 16 | 11 | 15 |
| Aged CHA | 0 | 95 | 1 | 4 | 82 |
| Example 22 | 2 | 75 | 19 | 5 | 17 |
| Example 22A | 4 | 85 | 11 | <1 | 34 |

Figure 10A:
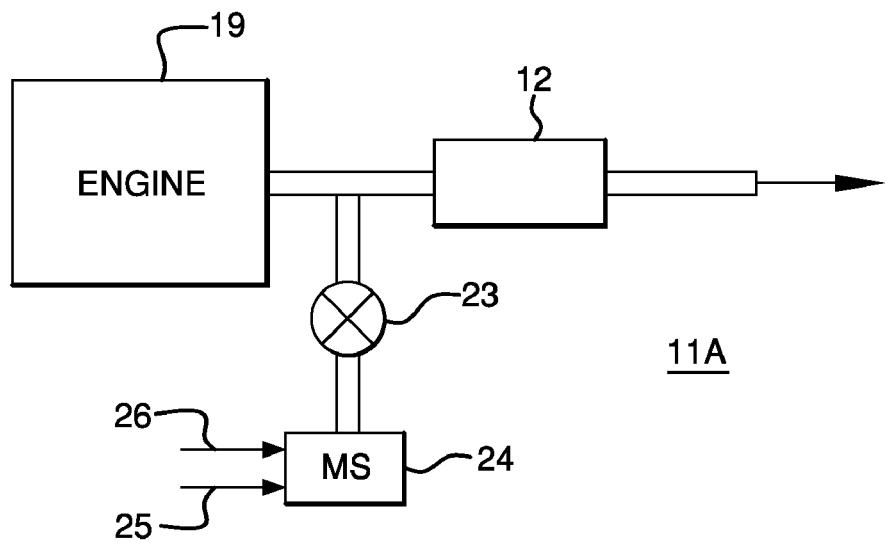
FIGS. 10A, 10B, and 10C are schematic depictions of three exemplary embodiments of the emissions treatment system of the invention.
Figure 10B:
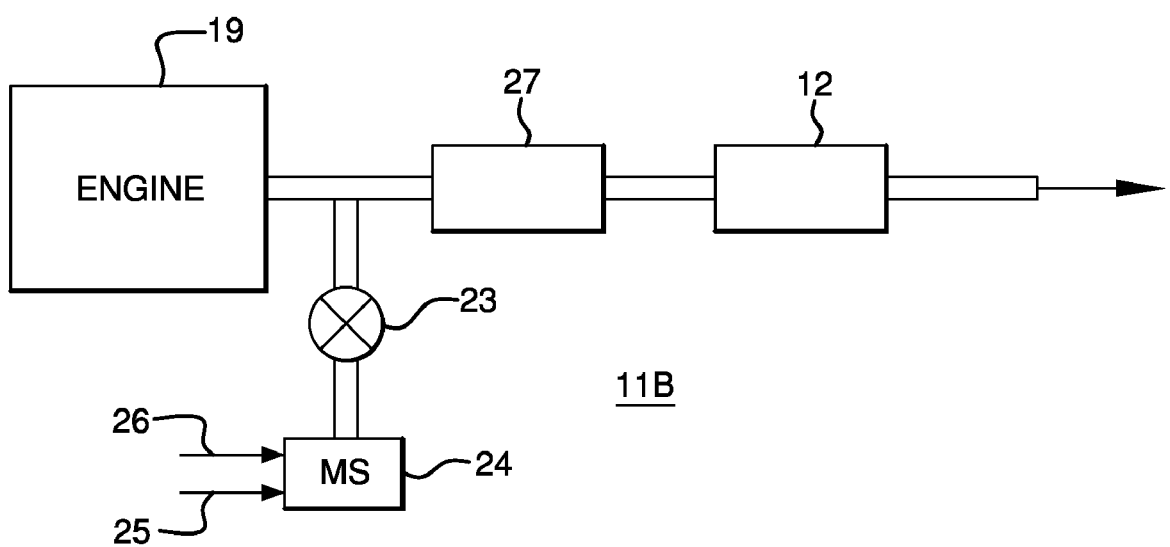
Figure 10C:
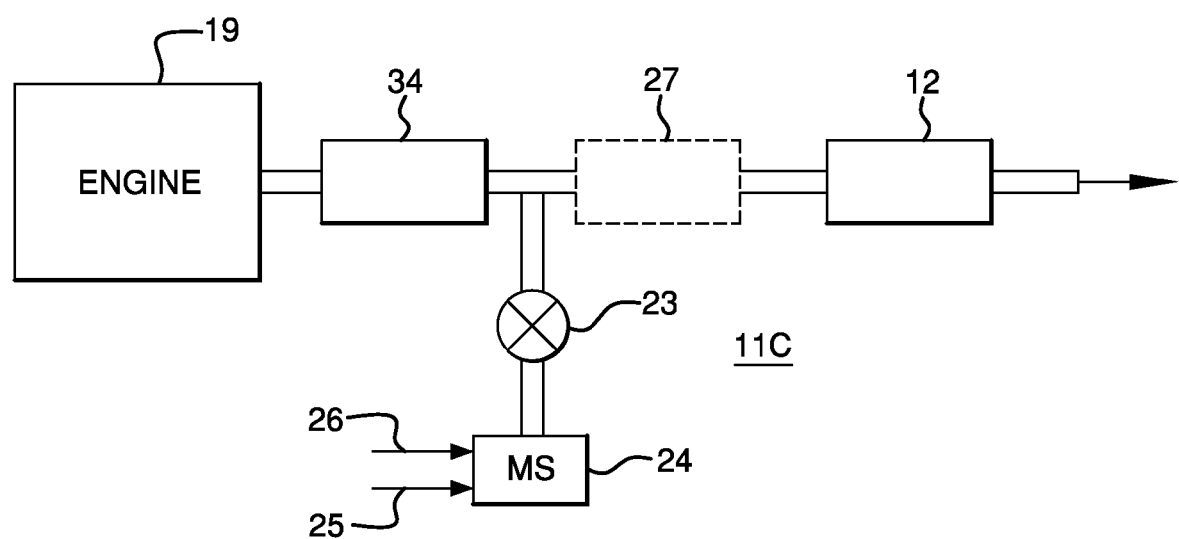

Exemplary embodiments of emission treatment systems are shown in FIGS. 10A, 10B and 10C. One embodiment of the inventive emissions treatment system denoted as 11A is schematically depicted in FIG. 10A. The exhaust, containing gaseous pollutants (including unburned hydrocarbons, carbon monoxide and NOx) and particulate matter, is conveyed from the engine 19 to a position downstream in the exhaust system where a reductant, i.e., ammonia or an ammonia-precursor, is added to the exhaust stream. The reductant is injected as a spray via a nozzle (not shown) into the exhaust stream. Aqueous urea shown on one line 25 can serve as the ammonia precursor which can be mixed with air on another line 26 in a mixing station 24. Valve 23 can be used to meter precise amounts of aqueous urea which are converted in the exhaust stream to ammonia.

The exhaust stream with the added ammonia is conveyed to the SCR catalyst substrate 12 (also referred to herein including the claims as "the first substrate") containing CuCHA in accordance with one or more embodiments. On passing through the first substrate 12, the NOx component of the exhaust stream is converted through the selective catalytic reduction of NOx with $NH_3$ to $N_2$ and $H_2O$. In addition, excess $NH_3$ that emerges from the inlet zone can be converted through oxidation by a downstream ammonia oxidation catalyst (not shown) also containing CuCHA to convert the ammonia to $N_2$ and $H_2O$. The first substrate is typically a flow through monolith substrate.

An alternative embodiment of the emissions treatment system, denoted as 11B is depicted in FIG. 10B which contains a second substrate 27 interposed between the $NH_3$ injector and the first substrate 12. In this embodiment, the second substrate is coated with an SCR catalyst composition which may be the same composition as is used to coat the first substrate 12 or a different composition. An advantageous feature of this embodiment is that the SCR catalyst compositions that are used to coat the substrate can be selected to optimize NOx conversion for the operating conditions characteristic of that site along the exhaust system. For example, the second substrate can be coated with an SCR catalyst composition that is better suited for higher operating temperatures experienced in upstream segments of the exhaust system, while another SCR composition can be used to coat the first substrate (i.e., the inlet zone of the first substrate) that is better suited to cooler exhaust temperature which are experienced in downstream segments of the exhaust system.

In the embodiment depicted in FIG. 10B, the second substrate 27 can either be a honeycomb flow through substrate, an open cell foam substrate or a honeycomb wall flow substrate. In configurations of this embodiment where the second substrate is a wall flow substrate or a high efficiency open cell foam filter, the system can remove greater than 80% of the particulate matter including the soot fraction and the SOF. An SCR-coated wall flow substrate and its utility in the reduction of NOx and particulate matter have been described, for instance, in co-pending U.S. patent application Ser. No. 10/634,659, filed Aug. 5, 2003, the disclosure of which is hereby incorporated by reference.

In some applications it may be advantageous to include an oxidation catalyst upstream of the site of ammonia/ammonia precursor injection. For instance, in the embodiment depicted in FIG. 10C an oxidation catalyst is disposed on a catalyst substrate 34. The emissions treatment system 11C is provided with the first substrate 12 and optionally includes a second substrate 27. In this embodiment, the exhaust stream is first conveyed to the catalyst substrate 34 where at least some of the gaseous hydrocarbons, CO and particulate matter are combusted to innocuous components. In addition, a significant fraction of the NO of the NOx component of the exhaust is converted to $NO_2$. Higher proportions of $NO_2$ in the NOx component facilitate the reduction of NOx to $N_2$ and $H_2O$ on the SCR catalyst(s) located downstream. It will be appreciated that in the embodiment shown in FIG. 10C, the first substrate 12 could be a catalyzed soot filter, and the SCR catalyst could be disposed on the catalyzed soot filter. In an alternative embodiment, the second substrate 27 comprising an SCR catalyst may be located upstream from catalyst substrate 34.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A process for the reduction of oxides of nitrogen contained in a gas stream in the presence of oxygen wherein said process comprises contacting the gas stream with a catalyst comprising a zeolite having the CHA crystal structure and a mole ratio of silica to alumina from about 15 to about 100 and an atomic ratio of copper to aluminum from about 0.25 to about 0.50.

2. The process of claim 1, wherein the gas stream is an exhaust gas stream from an internal combustion engine and the catalyst is disposed on a honeycomb flow through substrate.

3. The process of claim 2, wherein the exhaust gas stream further comprises ammonia and at least a portion of the flow through substrate is coated with CuCHA.

4. The process of claim 2, wherein at least a portion of the flow through substrate is coated with Pt and CuCHA to oxidize ammonia in the exhaust gas stream.

5. The process of claim 1, wherein the gas stream is an exhaust gas stream from an internal combustion engine and the catalyst is disposed on a honeycomb wall flow substrate.

6. The process of claim 5, wherein the exhaust gas stream further comprises ammonia and at least a portion of the wall flow substrate is coated with CuCHA.

7. The process of claim 5, wherein at least a portion of the wall flow substrate is coated with Pt and CuCHA to oxidize ammonia in the exhaust gas stream.

8. The process of claim 1, wherein the gas stream is an exhaust gas stream from an internal combustion engine and the process further comprises contacting the exhaust gas stream with a catalyzed soot filter.

9. The process of claim 8, wherein said catalyzed soot filter is upstream of said catalyst.

10. The process of claim 8, wherein said catalyzed soot filter is downstream of said catalyst.

11. The process of claim 8, further comprising contacting the exhaust gas stream with a diesel oxidation catalyst.

12. The process of claim 11, wherein said diesel oxidation catalyst is upstream of said catalyst comprising a zeolite having the CHA crystal structure.

13. The process of claim 12, wherein said diesel oxidation catalyst and catalyzed soot filter are upstream from said catalyst comprising a zeolite having the CHA crystal structure.

14. The process of claim 1, wherein the process further comprises adding a reductant to the gas stream.

15. The process of claim 14, wherein the reductant comprises ammonia or an ammonia precursor.

16. The process of claim 14, wherein the reductant comprises urea.

17. The process of claim 15, where the mole ratio of silica to alumina is from about 25 to about 40.

18. The process of claim 15, wherein the mole ratio of silica to alumina is about 30.

19. The process of claim 15, wherein the atomic ratio of copper to aluminum is from about 0.30 to about 0.50.

20. The process of claim 15, wherein the atomic ratio of copper to aluminum is about 0.40.

21. The process of claim 15, wherein the mole ratio of silica to alumina is from about 25 to about 40 and the atomic ratio of copper to aluminum is from about 0.30 to about 0.50.

22. The process of claim 15, wherein the mole ratio of silica to alumina is about 30 and the atomic ratio of copper to aluminum is about 0.40.

23. The process of claim 15, wherein the catalyst is disposed on a honeycomb flow-through substrate.

24. The process of claim 15, wherein the catalyst is disposed on a honeycomb wall flow filter substrate.

25. The process of claim 15, wherein the gas stream is an exhaust gas stream from an internal combustion engine and the process further comprises contacting the exhaust gas stream with a catalyzed soot filter and an oxidation catalyst, wherein the oxidation catalyst is upstream of the catalyst comprising a zeolite with the CHA crystal structure and the catalyzed soot filter are upstream from the catalyst comprising a zeolite with the CHA crystal structure.

26. A process for the reduction of oxides of nitrogen contained in a gas stream in the presence of oxygen wherein said process comprises adding a reductant to the gas stream and contacting the gas stream containing the reductant with a catalyst comprising a zeolite having the CHA crystal structure and a mole ratio of silica to alumina from about 15 to about 150 and an atomic ratio of copper to aluminum from about 0.25 to about 1.

27. The process of claim 26, wherein the reductant comprises ammonia or an ammonia precursor.

28. The process of claim 26, wherein the reductant comprises urea.

29. The process of claim 26, wherein the catalyst is disposed on a honeycomb flow-through substrate.

30. The process of claim 26, wherein the catalyst is disposed on a honeycomb wall flow filter substrate.

31. The process of claim 27, wherein the gas stream is an exhaust gas stream from an internal combustion engine and the process further comprises contacting the exhaust gas stream with a catalyzed soot filter and an oxidation catalyst, wherein the oxidation catalyst and the catalyzed soot filter are upstream from the catalyst comprising a zeolite with the CHA crystal structure.

* * * * *